(12) United States Patent
Xiao et al.

(10) Patent No.: US 10,552,335 B2
(45) Date of Patent: Feb. 4, 2020

(54) METHOD AND ELECTRONIC DEVICE FOR A MAPPING TABLE IN A SOLID-STATE MEMORY

(71) Applicants: BEIJING LENOVO SOFTWARE LTD., Beijing (CN); LENOVO (BEIJING) LIMITED, Beijing (CN)

(72) Inventors: Manjun Xiao, Beijing (CN); Wenjing Liu, Beijing (CN); Qian Ma, Beijing (CN); Qingtao Sun, Beijing (CN)

(73) Assignees: BEIJING LENOVO SOFTWARE LTD., Beijing (CN); LENOVO (BEIJING) LIMITED, Beijing (CN)

( * ) Notice: Subject to any disclaimer, the term of this patent is extended or adjusted under 35 U.S.C. 154(b) by 49 days.

(21) Appl. No.: 14/978,816

(22) Filed: Dec. 22, 2015

(65) Prior Publication Data

US 2017/0091115 A1    Mar. 30, 2017

(30) Foreign Application Priority Data

Sep. 25, 2015  (CN) .......................... 2015 1 0623694
Sep. 25, 2015  (CN) .......................... 2015 1 0624765

(51) Int. Cl.
  *G06F 12/10*    (2016.01)
  *G06F 12/1009*  (2016.01)
  *G06F 12/02*    (2006.01)

(52) U.S. Cl.
  CPC ...... *G06F 12/1009* (2013.01); *G06F 12/0246* (2013.01); *G06F 2212/7201* (2013.01)

(58) Field of Classification Search
  CPC ......... G06F 2212/7201; G06F 12/1009; G06F 12/0246
  USPC ......................................... 711/103
  See application file for complete search history.

(56) References Cited

U.S. PATENT DOCUMENTS

| | | | |
|---|---|---|---|
| 9,606,912 B2* | 3/2017 | Xu ....................... | G06F 12/0246 |
| 2014/0047170 A1* | 2/2014 | Cohen ................. | G06F 12/0246 711/103 |
| 2014/0082261 A1* | 3/2014 | Cohen .................... | G11C 16/06 711/103 |
| 2014/0304453 A1* | 10/2014 | Shao ................... | G06F 12/0246 711/103 |

(Continued)

*Primary Examiner* — David Yi
*Assistant Examiner* — Zubair Ahmed
(74) *Attorney, Agent, or Firm* — Scully Scott Murphy & Presser

(57) ABSTRACT

The invention provides a method and electronic device for a mapping table in a solid-state memory, wherein the mapping table comprises a primary mapping table and a secondary mapping table. The method comprises: mapping all logic pages from a host to physical pages of a flash on the solid-state memory in the unit of page to form the secondary mapping table, the secondary mapping table being stored in the flash on the solid-state memory; acquiring a first physical address which is the physical address of a first chunk of the secondary mapping table in the flash of the solid-state memory; and forming and storing the primary mapping table in the flash of the solid-state memory, wherein the first physical address and corresponding first identifying information form a mapping relationship in a mapping element of the primary mapping table, the first identifying information being identifying information of the first chunk.

18 Claims, 9 Drawing Sheets

(56) References Cited

U.S. PATENT DOCUMENTS

2014/0325117 A1* 10/2014 Canepa .............. G06F 12/0246
                                                          711/103
2016/0342509 A1* 11/2016 Kotte ................. G06F 12/0246

* cited by examiner

```
┌─────────────────────────────────────────────────────────┐
│ map all logic pages from a host to physical pages of a flash on │
│ a solid-state memory in the unit of page to form a secondary    │─── S101
│ mapping table, the secondary mapping table being stored in      │
│           the flash on the solid-state memory                    │
└─────────────────────────────────────────────────────────┘
                              │
                              ▼
┌─────────────────────────────────────────────────────────┐
│ acquire a first physical address which is the physical address │
│ of a first chunk of the secondary mapping table in the flash of │─── S102
│                    the solid-state memory                        │
└─────────────────────────────────────────────────────────┘
                              │
                              ▼
┌─────────────────────────────────────────────────────────┐
│ form and store a primary mapping table in the flash of the     │
│ solid-state memory, wherein the first physical address and     │
│ corresponding first identifying information form a mapping     │─── S103
│ relationship in a mapping element of the primary mapping       │
│ table, the first identifying information being the identifying │
│           information of the first chunk                        │
└─────────────────────────────────────────────────────────┘
```

Figure 1

METHOD AND ELECTRONIC DEVICE FOR A MAPPING TABLE IN A SOLID-STATE MEMORY

CROSS-REFERENCE TO RELATED APPLICATION(S)

This application claims priority to the Chinese Patent Application No. 201510623694.9, filed on Sep. 25, 2015, entitled "METHOD FOR FORMING A MAPPING TABLE," and the Chinese Patent Application No. 201510624765.7, filed on Sep. 25, 2015, entitled "METHOD AND ELECTRONIC DEVICE FOR UPDATING AND RECOVERING A MAPPING TABLE," which are incorporated herein by reference in their entirety.

TECHNICAL FIELD

The invention relates to electronic techniques, and particularly to a method and an electronic device for a mapping table in a solid-state memory.

BACKGROUND

The performance of the solid-state memory (SSD) is prominently higher than that of traditional magnetic disk storage. Recently, the solid-state memory has been increasingly used in the personal computers (PC) and the notebook computers due to the reduction of the cost of the solid-state memory.

The storage medium in the solid-state memory itself is typically a NAND flash, and its metadata includes the fundamental information recorded on a hard disk, such as a logic-physical mapping table, management information of other hard disks, etc. The metadata is firstly loaded from the NAND flash to the random access memory (RAM) of the solid-state memory when the solid-state memory is powered on. During its operation, the reading/writing operations to the hard disk may simultaneously involve changes of the metadata (especially, the mapping table). In order to meet the speed requirements, these changes occur directly on the RAM, so that the metadata should be updated to the NAND flash timely. Otherwise, if an abnormality causing a power-off occurs, the metadata will be inconsistent with data, by which the SSD may not operate normally after it is repowered.

There is no approach in the prior art for recovering the metadata when the abnormality causing a power-off occurs.

Furthermore, conventionally, metadata information should be loaded when a SSD hard disk is powered on. Mapping table information in the metadata will be very large if a page mapping method is used, while the response time for the hard disk, when the power-on occurs, is long if the whole the metadata information is loaded.

SUMMARY

Embodiments of the invention provide a method and electronic device for a mapping table in a solid-state memory, which can automatically recover metadata when an abnormality causing a power-off occurs, and thus improves the security of the data. The method and electronic device can also shorten the time for loading the metadata, which improves the experience of the user.

The solutions of embodiments of the invention are implemented as follows:

As for the first aspect, an embodiment of the invention provides a method for a mapping table in a solid-state memory, comprising:

mapping all logic pages from a host to physical pages of a flash on the solid-state memory in the unit of page to form a secondary mapping table, the secondary mapping table being stored in the flash on the solid-state memory;

acquiring a first physical address which is the physical address of a first chunk of the secondary mapping table in the flash of the solid-state memory; and forming and storing a primary mapping table in the flash of the solid-state memory, wherein the first physical address and corresponding first identifying information form a mapping relationship in a mapping element of the primary mapping table, the first identifying information being identifying information of the first chunk.

As for the second aspect, the method further comprises:

acquiring a parameter for updating the primary mapping table and the secondary mapping table;

determining whether the parameter satisfies a preset condition or not;

updating the mapping information in the secondary mapping table from the RAM of the solid-state memory to the flash if the preset condition is satisfied;

acquiring a second physical address and corresponding second identifying information, the second physical address being the physical address of the mapping information in chucks in the updated flash; and updating the primary mapping table according to the second identifying information and the second physical address.

As for the third aspect, the method further comprises recovering the secondary mapping table according to the primary mapping table when the secondary mapping table is damaged while the primary mapping table is complete, which particularly comprises:

acquiring a third physical address from the primary mapping table, the third physical address being the physical address stored in a mapping element of the primary mapping table;

acquiring secondary mapping table information of a corresponding third chunk according to the third physical address;

acquiring third identifying information from the primary mapping table, the third identifying information being the identifying information of the third chunk corresponding to the third physical address;

acquiring fourth identifying information from the secondary mapping table information of the third chunk according to the third physical address;

determining whether the third identifying information and the fourth identifying information are the same; and if they are the same, reading the secondary mapping table information of the third chunk from the flash of the solid-state memory to a RAM of the solid-state memory.

As for the fourth aspect, the method further comprises recovering the primary mapping table according to the secondary mapping table when the secondary mapping table has been updated while the primary mapping table was not updated, which particularly comprises:

according to fifth identifying information stored in a mapping element of the primary mapping table, acquiring the physical address of the chunk corresponding to the fifth identifying information;

updating the physical address stored in the mapping element corresponding to the fifth identifying information in the primary mapping table as the physical address of the corresponding chunk if the number of the physical addresses of the corresponding chunks is 1; and acquiring timestamp information corresponding to the physical address of each of the corresponding chunks if the number of the physical addresses of the corresponding chunks is greater than 1, and updating the physical address stored in the mapping element corresponding to the fifth identifying information in the primary mapping table as the physical address of the chunk with the latest timestamp.

As for the fifth aspect, each mapping element of the primary mapping table contains a flag of Q bits, the flag indicating history access information of a corresponding chunk.

As for the sixth aspect, the method further comprises:

acquiring the first identifying information if the first chunk having stored therein metadata has been read/written, wherein the first identifying information being identifying information of the first chunk;

searching the primary mapping table for a first mapping element according to the first identifying information; and updating the flag stored in the first mapping element.

As for the seventh aspect, the method further comprises:

reading a flag of a first mapping element of the primary mapping table, the flag indicating whether a first chunk was accessed or not last time, the first chunk being the chunk corresponding the first mapping element;

determining whether the first chunk was accessed or not last time according to the flag;

acquiring metadata information in a corresponding first chunk of the secondary mapping table according to the first identifying information of the first mapping element if the flag indicates that the first chunk was accessed last time, and reading the metadata information in the first chunk from a flash of the solid-state memory to a RAM of the solid-state memory.

As for the eighth aspect, the primary mapping table is read from the flash of the solid-state memory to the RAM of the solid-state memory after the power-on of the solid-state memory.

As for the ninth aspect, the metadata information in the first chunk is not read from the flash of the solid-state memory to the RAM of the solid-state memory if the flag indicates that the first chunk was not accessed last time.

As for the tenth aspect, an embodiment of the invention provides an electronic device comprising:

a first forming unit configured to map all logic pages from a host to physical pages of a flash on a solid-state memory by using a page-level mapping method to form a secondary mapping table, the secondary mapping table being stored in the flash on the solid-state memory;

a first acquiring unit configured to acquire a first physical address which is the physical address of a first chunk of the secondary mapping table in the flash of the solid-state memory; and a second forming unit is configured to form and store a primary mapping table in the flash of the solid-state memory, wherein the first physical address and corresponding first identifying information form a mapping relationship in a mapping element of the primary mapping table, the first identifying information being identifying information of the first chunk.

As for the eleventh aspect of the invention, the electronic device further comprises:

a second acquiring unit configured to acquire a parameter for updating the primary mapping table and the secondary mapping table;

a first determining unit configured to determine whether the parameter satisfies a preset condition or not;

a first updating unit configured to update the mapping information in the secondary mapping table from the RAM of the solid-state memory to the flash if the preset condition is satisfied;

a third acquiring unit configured to acquire a second physical address and corresponding second identifying information, the second physical address being the physical address of the mapping information in chucks in the updated flash; and a second updating unit configured to update the primary mapping table according to the second identifying information and the second physical address.

As for the twelfth aspect of the invention, the electronic device further comprises:

a fifth acquiring unit configured to acquire a third physical address from the primary mapping table, the third physical address being the physical address stored in a mapping element of the primary mapping table;

a sixth acquiring unit configured to acquire secondary mapping table information of a corresponding third chunk according to the third physical address;

a first reading unit configured to read the secondary mapping table information of the third chunk from the flash of the solid-state memory to the RAM of the solid-state memory;

a seventh acquiring unit configured to acquire third identifying information from the primary mapping table, the third identifying information being the identifying information of the third chunk corresponding to the third physical address;

an eighth acquiring unit configured to acquire fourth identifying information from the secondary mapping table information of the third chunk according to the third physical address;

a third determining unit configured to determine whether the third identifying information and the fourth identifying information are the same, and if they are the same, a second reading unit is triggered; and the second reading unit configured to read the secondary mapping table information of the third chunk from the flash of the solid-state memory to the RAM of the solid-state memory.

As for the thirteenth aspect of the invention, the electronic device further comprises:

a ninth acquiring unit configured to acquire the physical address of the chunk corresponding to the third identifying information;

a first writing unit configured to update the physical address stored in the mapping element corresponding to the third identifying information in the primary mapping table as the physical address of the corresponding chunk, if the number of the physical addresses of the corresponding chunks is 1;

a tenth acquiring unit configured to acquire timestamp information corresponding to the physical address of each of the corresponding chunks if the number of the physical addresses of the corresponding chunks is greater than 1; and a second writing unit configured to update the physical address stored in the mapping element corresponding to the third identifying information in the primary mapping table as the physical address of the chunk with the latest timestamp.

As for the fourteenth aspect, each mapping element of the primary mapping table contains a flag of Q bits, wherein the flag indicates history access information of a chunk. The electronic device further comprises:

an eleventh acquiring unit configured to acquire the first identifying information if the first chunk having stored therein metadata has been read/written, the first identifying information being identifying information of the first chunk;

a searching unit configured to search the primary mapping table for a first mapping element according to the first identifying information; and a fourth updating unit configured to update the flag of the first mapping element.

As for the fifteenth aspect, the electronic device further comprises:

a third reading unit configured to read a flag of a first mapping element of the primary mapping table, the flag indicating whether a first chunk was accessed or not last time, the first chunk being the chunk corresponding the first mapping element;

a fourth determining unit configured to determine whether the first chunk was accessed or not last time according to the flag;

a twelfth acquiring unit configured to acquire metadata information of a corresponding first chunk of the secondary mapping table according to the first identifying information of the first mapping element if the flag indicates that the first chunk was accessed last time; and a fourth reading unit configured to read the metadata information in the first chunk from a flash of a solid-state memory to a RAM of the solid-state memory.

As for the sixteenth aspect, the electronic device further comprises a fifth reading unit configured to read the primary mapping table from the flash of the solid-state memory to a RAM of the solid-state memory after the power-on of the solid-state memory.

As for the seventeenth aspect, the electronic device further comprises a processing unit configured not to read the metadata information in the first chunk from a flash of a solid-state memory to a RAM of the solid-state memory if the flag indicates that the first chunk was not accessed last time.

As for the eighteenth aspect, an embodiment of the invention provides an electronic device comprising a solid-state memory (SSD), the solid-state memory comprising a flash and a SSD controller, wherein:

the SSD controller is configured to map all logic pages from a host to physical pages of a flash on the solid-state memory by using a page-level mapping method to form a secondary mapping table, the secondary mapping table being stored in the flash on the solid-state memory; acquire a first physical address which is the physical address of a first chunk of the secondary mapping table in the flash of the solid-state memory; and form and store a primary mapping table in the flash of the solid-state memory, wherein the first physical address and corresponding first identifying information form a mapping relationship in a mapping element of the primary mapping table, the first identifying information being identifying information of the first chunk.

As for the nineteenth aspect, the SSD controller is further configured to acquire a parameter for updating the primary mapping table and the secondary mapping table; determine whether the parameter satisfies a preset condition or not; update the mapping information in the secondary mapping table from a RAM of the solid-state memory to the flash if the preset condition is satisfied; acquire a second physical address and corresponding second identifying information, the second physical address being the physical address of the mapping information in chucks in the updated flash; and update the primary mapping table according to the second identifying information and the second physical address.

As for the twentieth aspect, the SSD controller is further configured to acquire a third physical address from the primary mapping table, the third physical address being the physical address stored in a mapping element of the primary mapping table; acquire secondary mapping table information of a corresponding third chunk according to the third physical address; acquire third identifying information from the primary mapping table, the third identifying information being the identifying information of the third chunk corresponding to the third physical address; acquire fourth identifying information from the secondary mapping table information of the third chunk according to the third physical address; determine whether the third identifying information and the fourth identifying information are the same, and if they are the same, read the secondary mapping table information of the third chunk from the flash of the solid-state memory to a RAM of the solid-state memory.

As for the twenty-first aspect, the SSD controller is further configured to, according to fifth identifying information stored in a mapping element of the primary mapping table, acquire the physical address of the chunk corresponding to the fifth identifying information; update the physical address stored in the mapping element corresponding to the fifth identifying information in the primary mapping table as the physical address of the corresponding chunk, if the number of the physical addresses of the corresponding chunks is 1; and acquire timestamp information corresponding to the physical address of each of the corresponding chunks, and update the physical address stored in the mapping element corresponding to the fifth identifying information in the primary mapping table as the physical address of the chunk with the latest timestamp if the number of the physical addresses of the corresponding chunks is greater than 1.

As for the twenty-second aspect, each mapping element of the primary mapping table contains a flag of Q bits, wherein the flag indicates history access information of the corresponding chunk. The SSD controller is further configured to read a flag of a first mapping element of the primary mapping table, the flag indicating whether a first chunk was accessed or not last time, the first chunk being the chunk corresponding the first mapping element; determine whether the first chunk was accessed or not last time according to the flag; acquire metadata information in a corresponding first chunk of the secondary mapping table according to the first identifying information of the first mapping element if the flag indicates that the first chunk was accessed last time; and read the metadata information in the first chunk from the flash of the solid-state memory to a RAM of the solid-state memory.

Embodiments of the invention provide a method and electronic device for a mapping table in a solid-state memory, wherein the mapping table comprises a primary mapping table and a secondary mapping table. The method comprises: mapping all logic pages from a host to physical pages of a flash on the solid-state memory in the unit of page to form the secondary mapping table, the secondary mapping table being stored in the flash on the solid-state memory; acquiring a first physical address which is the physical address of a first chunk of the secondary mapping table in the flash of the solid-state memory; and forming and storing the primary mapping table in the flash of the solid-state memory, wherein the first physical address and corresponding first identifying information form a mapping relationship in a mapping element of the primary mapping table, the first identifying information being identifying information of the first chunk. Thereby, metadata can be recovered automatically when an abnormality causing a power-off occurs, and thus improves the security of the data. Further, each mapping element of the primary mapping table contains a flag of Q bits, the flag indicating history access information of a corresponding chunk, by which the time for loading the metadata can be shortened and thus the experience of the user is improved.

BRIEF DESCRIPTION OF THE DRAWINGS

FIG. 1 is a view illustrating an implementation flow of a method for forming a mapping table according to the first embodiment of the invention;

FIG. 3-1 is a view illustrating an implementation flow of a method for recovering a mapping table according to the fourth embodiment of the invention;

FIG. 3-2 is a view illustrating the correspondence between a primary mapping table and a secondary mapping table according to the fourth embodiment of the invention;

DETAILED DESCRIPTION

Figure 2:
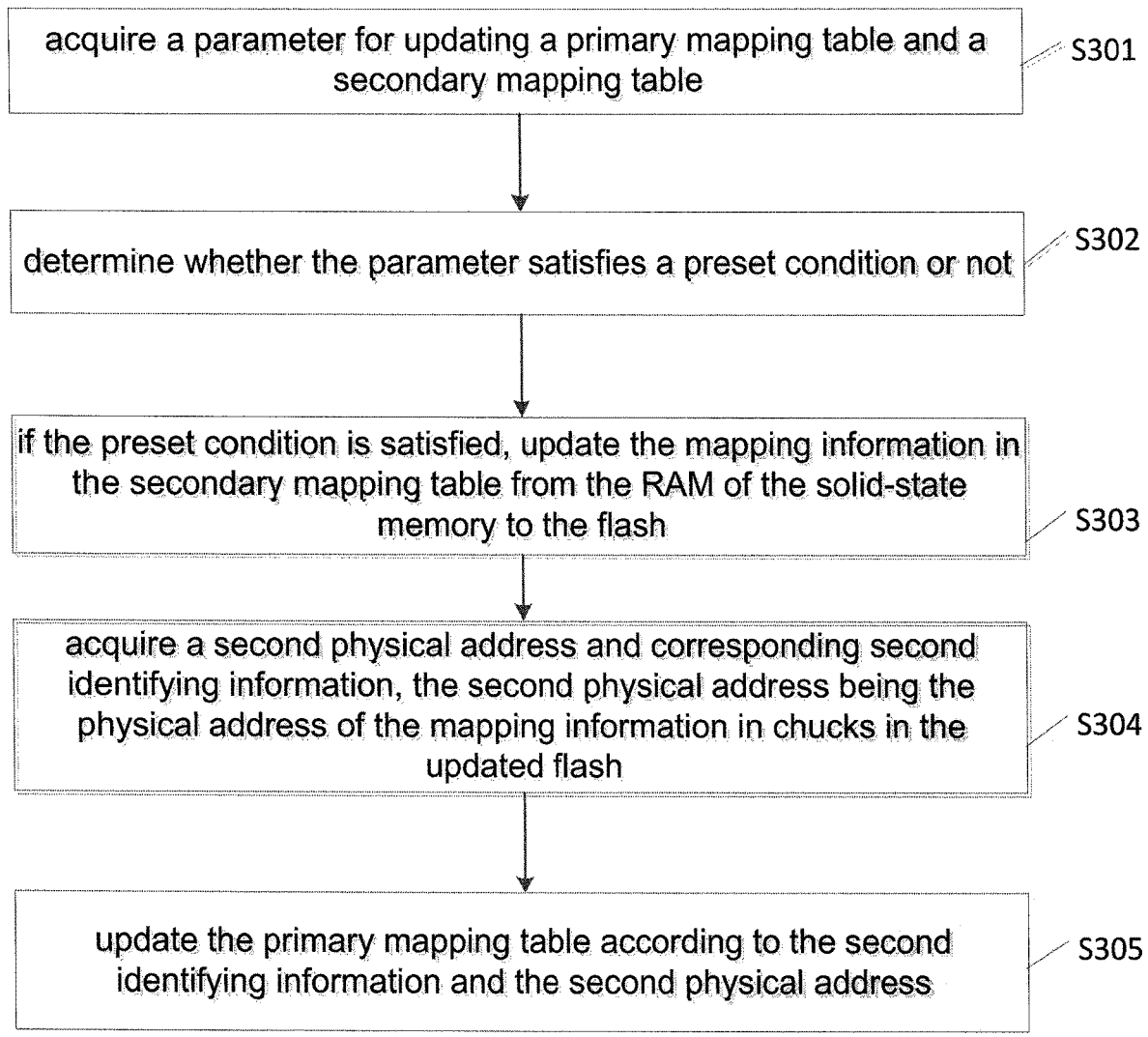
FIG. 2 is a view illustrating an implementation flow of a method for updating a mapping table according to the third embodiment of the invention.

Conventionally, the SSD has only one page mapping table. Some fundamental conceptions of the SSD will be introduced firstly before the introduction of the page mapping table.

1) Physical Block and Physical Page

It is impossible to read/write only one flash element because of the limitation of the structure of the NAND flash element. The NAND flash element is organized in physical blocks. The smallest writable/readable unit in a physical block is called a physical page. The physical page can be erased only in blocks rather than in the unit of page. The sizes of the physical pages of the NAND flash may not be the same. Physical pages of most hard disks have a size of 2 KB, 4 KB or 16 KB and the blocks of most SSD have 128 or 258 physical pages, which means that the size of a physical block may be a value between 256 KB and 4 MB. For example, a physical block of Samsung SSD 840 EVO has a size of 2048 KB where each physical block has 256 physical pages with a size of 8 KB.

The reading/writing is done in a size of physical page: one reading with contents less than a physical page is impossible. Though the operation system may request for only one byte, the SSD will access the whole physical page and compulsorily read data more than the required. When data is written into the SSD, the writing increment will also be done in the unit of page. Therefore, even if one writing operation relates to only one byte, the whole physical page will be written in any case. The behavior of writing data more than the required is called write amplification.

The physical page cannot be rewritten: the physical page in the NAND flash can be written only in case that the physical page is "in idle." Upon the change of data, the contents of a physical page are copied to an internal register. The data is updated and a new version of data is then stored in an "idle" physical page. This is called a "read-modify-write" operation. The data will be not updated at its previous location because the "idle" physical page is not the one that previously stores the data. If the data has been saved on the hard disk, the previous physical page is marked as "stale" until it is erased.

The easing is done in physical blocks: the physical page cannot be rewritten, and once the physical page became a "stale" one, the only way for making the physical page idle is to erase it. It is impossible to erase only a single physical page. The whole physical block must be erased at one time. From the view of a user, only reading/writing commands are used when accessing the data. The erasing command is triggered by a trash recycling process of a SSD controller when the SSD controller needs to recycle the stale physical page to obtain an idle space.

Cached small scale writing: in order to maximize the throughout, small amounts of data are written into a RAM cache, and a large scale writing is performed after the cache is full to combine all the small scale writings.

2) Loss Balance

The NAND memory element has a life cycle limitation due to its P/E cycle limitation. Taking one SSD as an example, the data is always written at a same physical block. As a result, this physical block will reach its P/E cycle limitation soon and then be exhausted. Then the SSD controller marks this physical block as unavailable, which leads to a reduction of the hard disk capacity. Therefore, one of the main targets of the SSD controller is to implement the loss balance, i.e. distributing the P/E cycles among the physical blocks as averagely as possible. Ideally, all the physical blocks will reach the P/E cycle limitation at the same time and then be exhausted. In order to achieve an optimum global loss balance, the SSD controller should wisely select the physical block to be written, and possibly needs to move among several physical blocks, in which case its internal processes will lead to the increase of the write amplifications. Consequently, the management of the physical blocks is to achieve the balance between maximizing the loss balance and minimizing the write amplifications.

3) Flash Translation Layer (FTL)

The Flash Translation Layer is a component of the SSD controller. One of its functions is to map the logic address from a host to the physical address on the hard disk. Another function of the FTL is trash recycling.

4) Page-Level Mapping

The page-level mapping method translates the logic page (LBA) in the host space to the physical page (PBA) in the physical NAND flash space. In consideration of the access speed, a page-level mapping table is stored in the RAM of the SSD, as well as in the flash to defend against a power fault. After the power-on of the SSD, this page-level mapping table is read from the flash and reconstructed in the RAM of the SSD.

The page level mapping method provides a large flexibility but with a main shortcoming that the mapping table needs a mass of memories, which will significantly increase the manufacture cost. In order to avoid the operation load caused by a plenty of small updates, all the physical blocks of the flash will be read whether the physical page is full or not.

5) Data change rate is an important effect factor. Some data seldom changes, which is called cold data or static data, while some data is updated frequently, which is called hot data or dynamic data. If one portion of one physical page stores cold data and the other portion of the physical page stores hot data, the cold data will be copied together with the hot data during the trash recycling for loss balance. The presence of the cold data increases the write amplification. This can be avoided by separating the cold data from the hot data and storing it in another physical page, which, however, will cause the physical page storing the cold data to be erased more seldom. Therefore, the blocks for storing the cold data and the hot data should be exchanged frequently to guarantee the loss balance.

Conventionally, FTL cannot know which physical page is used for cold data or hot data because the hot degree of the data is determined at the application level. However, in the solutions provided below in the invention, the cold data and the hot data can be separated and two-level mapping tables can be loaded intentionally based on the cold data and the hot data.

As described above, the page-level mapping table is very large and usually needs to be loaded in its entirety during the operation. Such a solution needs a mass of memories, and has a high error rate. In order to address the above technical problem, embodiments of the invention provide a two-level mapping mechanism which, in addition to uses the above described page-level mapping table as a secondary mapping table, further extracts a primary mapping table according to the secondary mapping table. The mapping relationship between the physical address of each chunk in the secondary mapping stable and the identifying information of the chunk is stored in each mapping element in the primary mapping table. In brief, the secondary mapping table is processed as data, i.e. the secondary mapping table is divided in chunks, and, at the same time, identifying information is added to the divided chunks, then the physical addresses of the divided chunks and its corresponding identifying information are filled into mapping elements which thus form a primary mapping table.

The solutions of the invention will be described in detail by referring the figures and the embodiments.

First Embodiment

An embodiment of the invention provides a method for forming a mapping table which is applied to an electronic device. The functions carried out by this method for forming a mapping table can be implemented by a SSD controller in the electronic device invoking program codes. The program codes, of course, can be stored in a computer storing medium. That is, the electronic device includes at least a SSD controller and a storing medium.

Figures 1, 3:
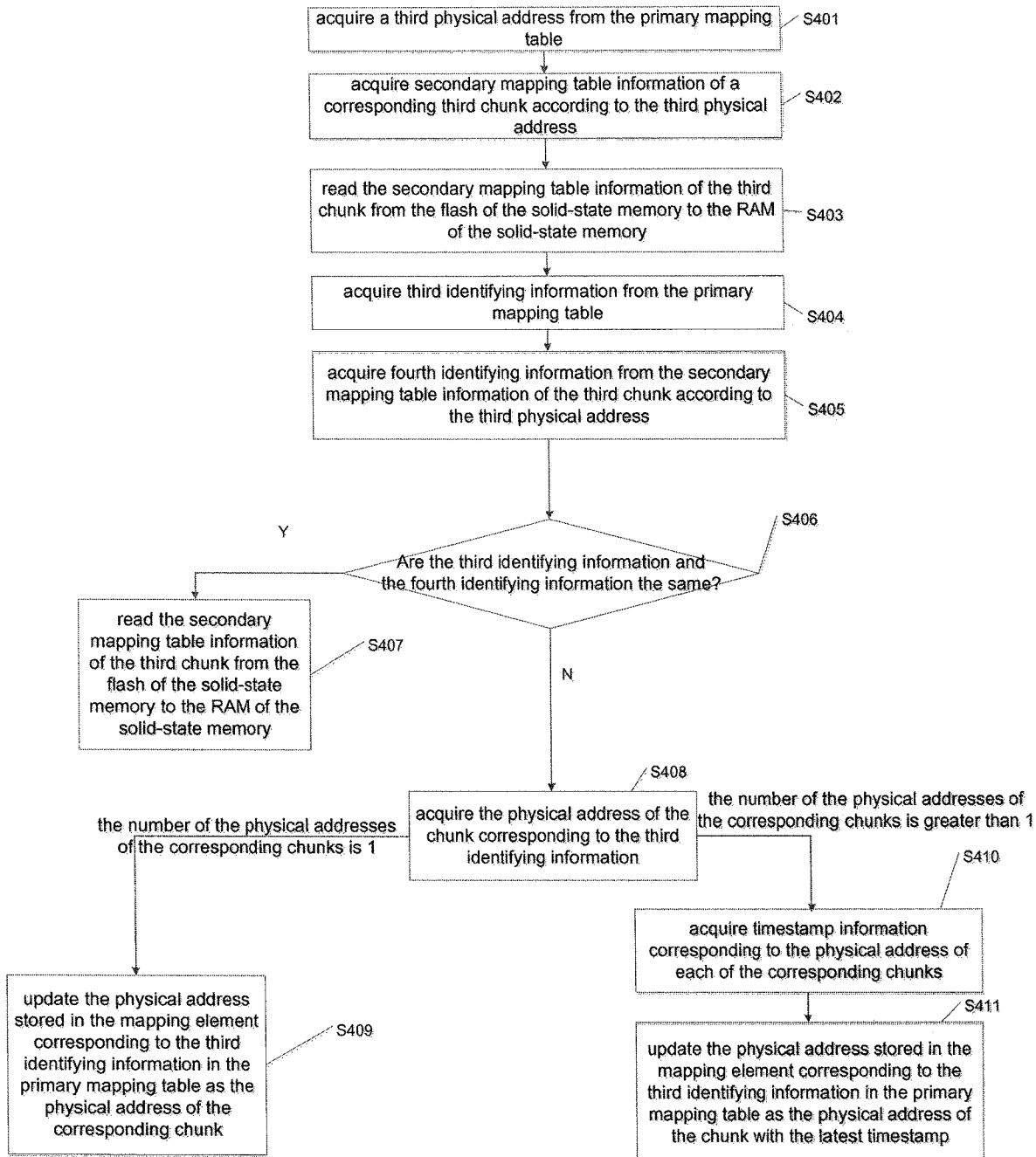
Figures 2, 3:
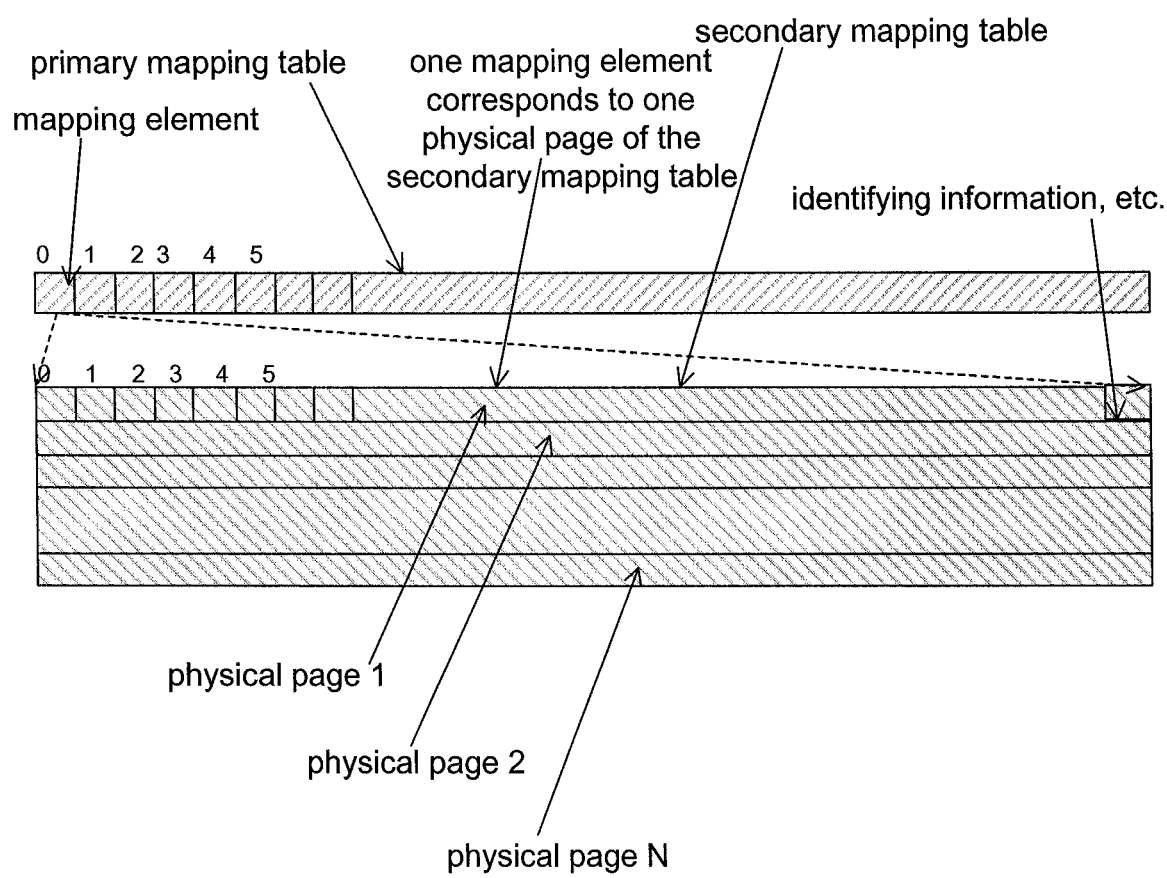

FIG. 1 is a view illustrating an implementation flow of a method for forming a mapping table according to the first embodiment of the invention. As shown in FIG. 1, the method includes:

Step S101, mapping all logic pages from a host to physical pages of a flash on a solid-state memory in the unit of page to form a secondary mapping table, the secondary mapping table being stored in the flash on the solid-state memory;

The mapping table here includes a primary mapping table and a secondary mapping table. The host refers to an electronic device with respect to the solid-state memory, a page-level mapping table is typically formed by using the page-level mapping method. Such a page-level mapping table, in the embodiment of the invention, is taken as the secondary mapping table used in the two-level mapping mechanism of the embodiment of the invention.

Step S102, acquiring a first physical address which is the physical address of a first chunk of the secondary mapping table in the flash of the solid-state memory;

Here the secondary mapping table in step S101 needs to be divided in chunks, i.e. the secondary mapping table is divided in chunks to obtain a divided secondary mapping table. In a particular implementation, the chunk may be a physical page or a physical block, or less than a physical page as long as a physical address representative of the chunk can be found. The first chunk may be any chunk in the divided secondary mapping table. Or said differently, the first chunk may be any chunk when the mapping information in the secondary mapping table is stored in chunks.

Step S103, forming and storing a primary mapping table in the flash of the solid-state memory, wherein the first physical address and corresponding first identifying information form a mapping relationship in a mapping element of the primary mapping table, the first identifying information being identifying information of the first chunk;

Here, identifying information is allocated to each chunk of the secondary mapping table which is divided in chunks. Then a correspondence between the physical address of the first chunk of the secondary mapping table (i.e. the first physical address), which is acquired in Step S102, and the identifying information of the corresponding chunk (i.e. the first identifying information) is established to form a mapping relationship in each mapping element of the primary mapping table.

In the embodiment of the invention, the mapping information of the secondary mapping table is stored in the flash in chunks.

As an example, a physical page is used as the chunk so that only little change needs to be made to the existing SSD.

In the embodiment of the invention, the primary mapping table is stored in the flash in its entirety. In the embodiment of the invention, the space occupied by the primary mapping table is small because it is extracted from the secondary mapping table(s). Therefore, the primary mapping table can be read and written in its entirety during its loading.

It should be noted that the page-level mapping table in the prior art which is used as the secondary mapping table in the embodiment of the invention may need to be modified, i.e. after the secondary mapping table is divided in chunks, one storing unit in each chunk of the mapping information of the secondary mapping table is reserved for storing the identifying information of this chunk. Therefore, mapping information of the first chunk in the secondary mapping table in the embodiment of the invention further includes the first identifying information.

In the embodiment of the invention, if the system of the electronic device is powered off normally, when it is powered on again, the operation system will load the primary mapping table firstly, and then the secondary mapping table.

Second Embodiment

Based on the previous embodiment, an embodiment of the invention provides a method for forming a mapping table which is applied to an electronic device. The functions carried out by this method for forming a mapping table can be implemented by a SSD controller in the electronic device invoking program codes. The program codes, of course, can be stored in a computer storing medium. That is, the electronic device includes at least a SSD controller and a storing medium.

The method includes:

Step S201, mapping all logic pages from a host to physical pages of a flash on a solid-state memory in the unit of page to form a secondary mapping table, the secondary mapping table being stored in the flash on the solid-state memory;

The mapping table here includes a primary mapping table and a secondary mapping table. The host refers to an electronic device with respect to the solid-state memory, a page-level mapping table is typically formed by using the page-level mapping method. Such a page-level mapping table, in the embodiment of the invention, is taken as the secondary mapping table used in the two-level mapping mechanism of the embodiment of the invention.

Step S202, acquiring a first physical address which is the physical address of a first chunk of the secondary mapping table in the flash of the solid-state memory;

Here the secondary mapping table in step S101 needs to be divided in chunks, i.e. the secondary mapping table is divided in chunks to obtain a divided secondary mapping table. In a particular implementation, the chunk may be a physical page or a physical block, or less than a physical page as long as a physical address representative of the chunk can be found. The first chunk may be any chunk in the divided secondary mapping table. Or said differently, the first chunk may be any chunk when the mapping information in the secondary mapping table is stored in chunks.

Step S203, forming and storing a primary mapping table in the flash of the solid-state memory, wherein the first physical address and corresponding first identifying information form a mapping relationship;

Here the first identifying information is identifying information of the first chunk.

Step S204, recording information about storing of the mapping information of the first chunk in the flash of the solid-state memory, such as the timestamp information and version tag information, etc.;

Step S205, acquiring the first identifying information of the first chunk from the secondary mapping table;

Step S206, searching the primary mapping table for a first mapping element according to the first identifying information;

Step S207, recording the timestamp information and the version tag information in the first mapping element.

According to the method of the second embodiment, each mapping element in the primary mapping table further includes information for recording that the mapping information in chunks in the secondary mapping table is stored in the flash of the solid-state memory, such as the timestamp information and version tag information, etc. Furthermore, it should be noted that each chunk of the secondary mapping table also records the timestamp information and version tag information of the chunk.

Conventionally, after the power-on of the SSD, the page-level mapping table is loaded from the flash into the RAM. During the operation, the data reading/writing operations of the hard disk will simultaneously involve changes of the page-level mapping table. After a period of time, in order to guarantee the synchronization between the page-level mapping table in the RAM and the page-level mapping table in the flash, the page-level mapping table in the flash is usually synchronized. After the completion of the synchronization, the timestamp information and version tag information of the chunk will be recorded.

In the second embodiment, the timestamp information and version tag information of the chunk is recorded in the primary mapping table so that they can be saved in the primary mapping table.

The reason why the timestamp information and version tag information of the chunk need to be recorded into both the primary mapping table and the secondary mapping table is that: when an abnormality causing a power-off occurs, the primary mapping table can be recovered from the secondary mapping table stored in the flash; and if the up-to-date version of the primary mapping table needs to be recovered, it can be recovered by using the version information and the timestamp information in the secondary mapping table. How to recover the secondary mapping table according to the primary mapping table and how to recover the primary mapping table according to the secondary mapping table will be described in detail in the following embodiment, during which the above version information and timestamp information will be used.

Third Embodiment

Based on the previous embodiments, an embodiment of the invention provides a method for updating a mapping table which is applied to an electronic device. The functions carried out by this method for updating a mapping table can be implemented by a SSD controller in the electronic device invoking program codes. The program codes, of course, can be stored in a computer storing medium. That is, the electronic device includes at least a SSD controller and a storing medium.

FIG. 2 is a view illustrating an implementation flow of a method for updating a mapping table according to the third embodiment of the invention. As shown in FIG. 2, the method for updating a mapping table includes:

Step S301, acquiring a parameter for updating a mapping table;

The mapping table here includes a primary mapping table and a secondary mapping table, wherein the relationship between the primary mapping table and the secondary mapping table are the same as those in the previous first and second embodiments. The parameter for updating a mapping table may include parameters such as rewriting ratio, rewriting number or time period, etc. The rewriting ratio here refers to the ratio between the rewritten portion of the mapping table and the whole mapping table.

Step S302, determining whether the parameter satisfies a preset condition or not;

Here taking the example in the above step S301, i.e., the rewriting ratio as an example and assuming that a preset condition is 20%, the rewriting ratio of the current mapping table is acquired, and it is determined whether the ratio is higher than 20% or not. The parameter is determined as satisfying the preset condition if the ratio is higher than 20%, or otherwise as dissatisfying the preset condition.

Step S303, if the preset condition is satisfied, updating the mapping information in the secondary mapping table from a RAM of the solid-state memory to the flash;

Step S304, acquiring a second physical address and corresponding second identifying information, the second physical address being the physical address of the mapping information in chucks in the updated flash;

It should be noted here that the SSD cannot be written by means of overwriting. Therefore, if the physical address of the first chunk before the update is the first physical address, the physical address of the first chunk after the update cannot be the first physical address any more. Or said differently, the second physical address in Step S304 is different from the first physical address. Generally, the identifying information of the chunk does not change, or in other words, the identifying information can only be added or disabled. The adding means that new identifying information is split from the previous identifying information, so that what needed to do is only to fill the newly split identifying information and corresponding physical address into a new mapping element of the primary mapping table. If a previous chunk was deleted, the chunk is set as "stale" and its identifying information can be reused or disabled directly. Accordingly, in the primary mapping table, if the identifying information of a chunk is reused, the corresponding mapping element will be filled with a new physical address. However, if the identifying information of this chunk is disabled, the previous corresponding mapping element should be deleted.

Step S305, updating the primary mapping table according to the second identifying information and the second physical address.

It is determined here whether the second identifying information exists in the primary mapping table or not; if it exists, the primary mapping table is searched for a second mapping element according to the second identifying information, and then the physical address stored in the second mapping element is updated as the second physical address. If the second identifying information does not exist in the primary mapping table, the second identifying information and the second physical address are written into a new mapping element to form the mapping relationship of a new chunk in the new mapping element.

In the embodiment of the invention, the method further includes:

Step S306, determining whether the secondary mapping table is completely updated from the RAM of the solid-state memory to the flash;

Step S307, if it is, acquiring the second physical address and the second identifying information again;

Step S308, if it is not, continuing to update the secondary mapping table from the RAM of the solid-state memory to the flash.

Fourth Embodiment

Based on the previous embodiments, an embodiment of the invention provides a method for recovering a mapping table which is applied to an electronic device. The functions carried out by this method for recovering a mapping table can be implemented by a SSD controller in the electronic device invoking program codes. The program codes, of course, can be stored in a computer storing medium. That is, the electronic device includes at least a SSD controller and a storing medium.

According to the recovering method provided by the embodiment of the invention, when the secondary mapping table is damaged while the primary mapping table is complete, the secondary mapping table can be recovered according to the primary mapping table. For example, if a system is powered off due to an abnormality, a recovery will be performed next time the system is powered on by directly acquiring and loading the up-to-date primary mapping table in the flash. There may be two different situations: situation 1, the system power-off occurs at the non-metadata update stage, which is a simple situation and only needs to load the secondary mapping table from the primary mapping table; situation 2, the system power-off occurs at the metadata update stage, which needs to deduce the primary mapping table from the secondary mapping table. The following steps are used to describe the method for recovering a mapping table in the above situation 2.

FIG. 3-1 is a view illustrating an implementation flow of a method for recovering a mapping table according to the fourth embodiment of the invention. As shown in FIG. 3-1, the method includes:

Step S401, acquiring a third physical address from the primary mapping table;

The third physical address here is the physical address stored in a mapping element of the primary mapping table.

Step S402, acquiring secondary mapping table information of a corresponding third chunk according to the third physical address;

Here, the secondary mapping table stores metadata information. If the secondary mapping table is divided in chunks, the information stored in each chunk is called the secondary mapping table information.

Step S403, reading the secondary mapping table information of the third chunk from the flash of the solid-state memory to the RAM of the solid-state memory;

Step S404, acquiring third identifying information from the primary mapping table, the third identifying information being the identifying information of the third chunk corresponding to the third physical address;

Step S405, acquiring fourth identifying information from the secondary mapping table information of the third chunk according to the third physical address;

Step S406, determining whether the third identifying information and the fourth identifying information are the same;

If they are the same, the third identifying information and the fourth identifying information represent the same chunk.

Step S407, if they are the same, reading the secondary mapping table information of the third chunk from the flash of the solid-state memory to the RAM of the solid-state memory;

Step S408, if they are not the same, acquiring the physical address of the chunk corresponding to the third identifying information;

Step S409, if the number of the physical addresses of the corresponding chunks is 1, updating the physical address stored in the mapping element corresponding to the third identifying information in the primary mapping table as the physical address of the corresponding chunk;

Step S410, if the number of the physical addresses of the corresponding chunks is greater than 1, acquiring timestamp information corresponding to the physical address of each of the corresponding chunks;

Step S411, updating the physical address stored in the mapping element corresponding to the third identifying information in the primary mapping table as the physical address of the chunk with the latest timestamp.

Taking the physical page as an example of the chunk, the technical method provided by the embodiment of the invention includes:

Step S421, as shown in FIG. 3-2, dividing the secondary mapping table into a plurality of elements in the unit of physical page (mapping table page) to form a new mapping table indexing the physical addresses where the secondary mapping table is stored, i.e. a primary mapping table;

Step S422, allocating identifying information to each physical page of the secondary mapping table, and recording the timestamp information when a page is stored to the flash;

Step S423, when an update strategy initiates one update, firstly updating the secondary mapping table locally, updating the primary mapping table globally after the completion of the update of the secondary mapping table, and then updating the miscdata key metadata;

Step S424, when a power-off occurs, the secondary mapping table may be recovered according to the primary mapping table which has been stored in the flash; even if new modifications have not been updated to the flash due to the power-off, the secondary mapping table can be reconstructed by the old version of the secondary mapping table;

Step S425, if the up-to-date version of the primary mapping table needs to be recovered, the up-to-date version of the primary mapping table can be generated by scanning the whole secondary mapping table using the identifying information and the timestamp information of the secondary mapping table and reconstructing the updated secondary mapping table, so as to reduce the power-off losing.

As can be seen from the above, when the up-to-date version of the primary mapping table needs to be recovered, the identifying information (encoded index) and the timestamp information of each of the physical pages of the secondary mapping table can be used, and then the up-to-date version of the primary mapping table can be recovered. In the embodiment of the invention, the mapping table information of the SSD is managed by using the two-level mapping mechanism. Thereby the primary mapping table can be recovered according to the secondary mapping table stored in the flash when an abnormality causing a power-off occurs.

Fifth Embodiment

Based on the previous embodiments, an embodiment of the invention provides a method for recovering a mapping table which is applied to an electronic device. The functions carried out by this method for recovering a mapping table can be implemented by a SSD controller in the electronic device invoking program codes. The program codes, of course, can be stored in a computer storing medium. That is, the electronic device includes at least a SSD controller and a storing medium.

According to the recovering method provided by the embodiment of the invention, when the secondary mapping table has been updated while the primary mapping table was not updated, the primary mapping table is recovered according to the updated secondary mapping table. The method for recovering a mapping table particularly includes:

Step S501, according to fifth identifying information stored in a mapping element of the primary mapping table, acquiring the physical address of the chunk corresponding to the fifth identifying information;

Step S502, if the number of the physical addresses of the corresponding chunks is 1, updating the physical address stored in the mapping element corresponding to the fifth identifying information in the primary mapping table as the physical address of the corresponding chunk;

Step S503, if the number of the physical addresses of the corresponding chunks is greater than 1, acquiring timestamp information corresponding to the physical address of each of the corresponding chunks;

Step S504, updating the physical address stored in the mapping element corresponding to the fifth identifying information in the primary mapping table as the physical address of the chunk with the latest timestamp.

Sixth Embodiment

Based on the previous embodiments, an embodiment of the invention provides a method for forming a mapping table which is applied to an electronic device. The functions carried out by this method for forming a mapping table can be implemented by a SSD controller in the electronic device invoking program codes. The program codes, of course, can be stored in a computer storing medium. That is, the electronic device includes at least a SSD controller and a storing medium.

Figure 4:
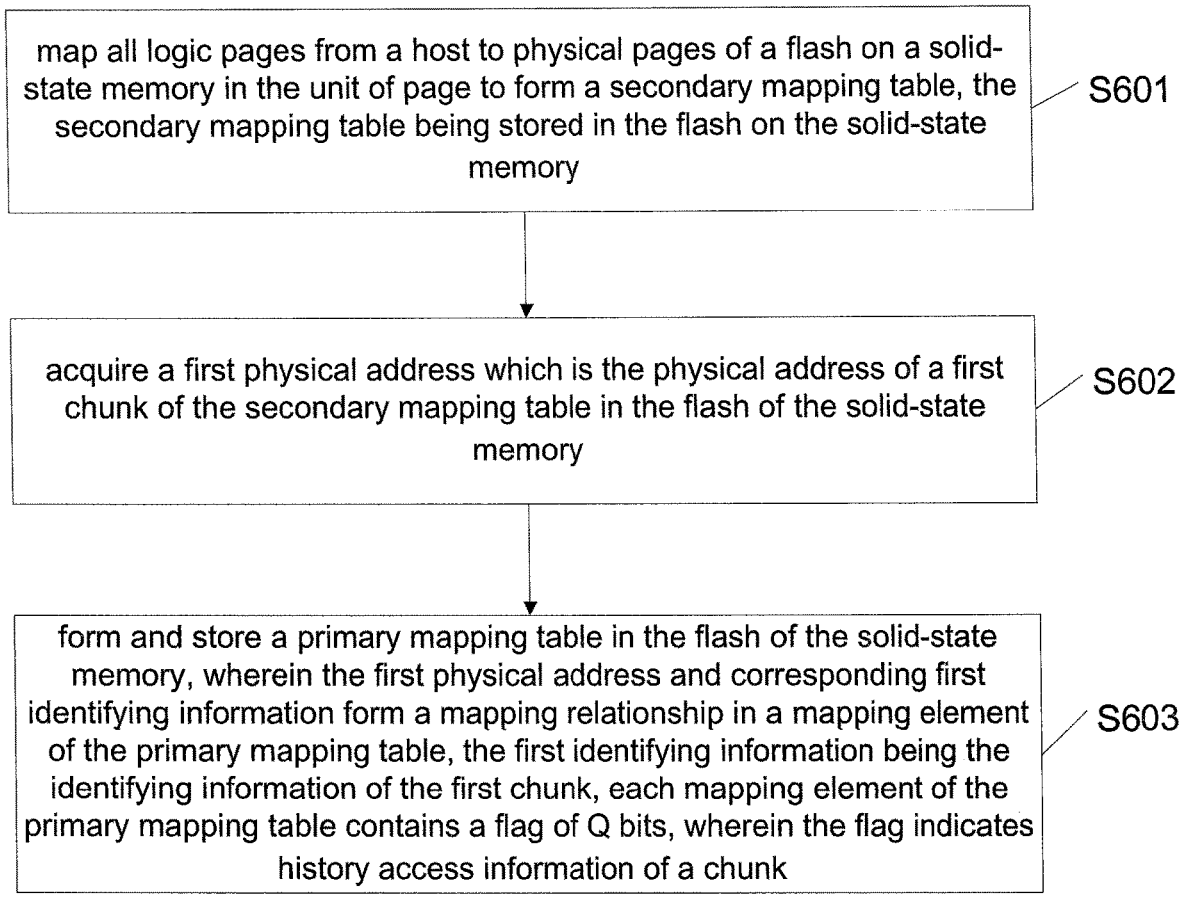
FIG. 4 is a view illustrating an implementation flow of a method for forming a mapping table according to the sixth embodiment of the invention.

FIG. 4 is a view illustrating an implementation flow of a method for forming a mapping table according to the sixth embodiment of the invention. As shown in FIG. 4, the method includes:

Step S601, mapping all logic pages from a host to physical pages of a flash on a solid-state memory in the unit of page to form a secondary mapping table, the secondary mapping table being stored in the flash on the solid-state memory;

The mapping table here includes a primary mapping table and a secondary mapping table. The host refers to an electronic device with respect to the solid-state memory. Conventionally, a page-level mapping table is typically formed by using the page-level mapping method. Such a page-level mapping table, in the embodiment of the invention, is taken as the secondary mapping table used in the two-level mapping mechanism of the embodiment of the invention.

Step S602, acquiring a first physical address which is the physical address of a first chunk of the secondary mapping table in the flash of the solid-state memory;

Here the secondary mapping table in step S601 needs to be divided in chunks, i.e. the secondary mapping table is divided in chunks to obtain a divided secondary mapping table. In a particular implementation, the chunk may be a physical page or a physical block, or less than a physical page as long as a physical address representative of the chunk can be found. The first chunk may be any chunk in the divided secondary mapping table. Or said differently, the first chunk may be any chunk when the mapping information in the secondary mapping table is stored in chunks.

Step S603, forming and storing a primary mapping table in the flash of the solid-state memory, wherein the first physical address and corresponding first identifying information form a mapping relationship in a mapping element of the primary mapping table, the first identifying information being identifying information of the first chunk;

Each mapping element of the primary mapping table contains a flag of Q bits, wherein the flag indicates history access information of a chunk, and Q is an integer equal to or greater than 1.

The history access information here includes at least the information indicating whether the first chunk was accessed or not last time.

Figure 5:
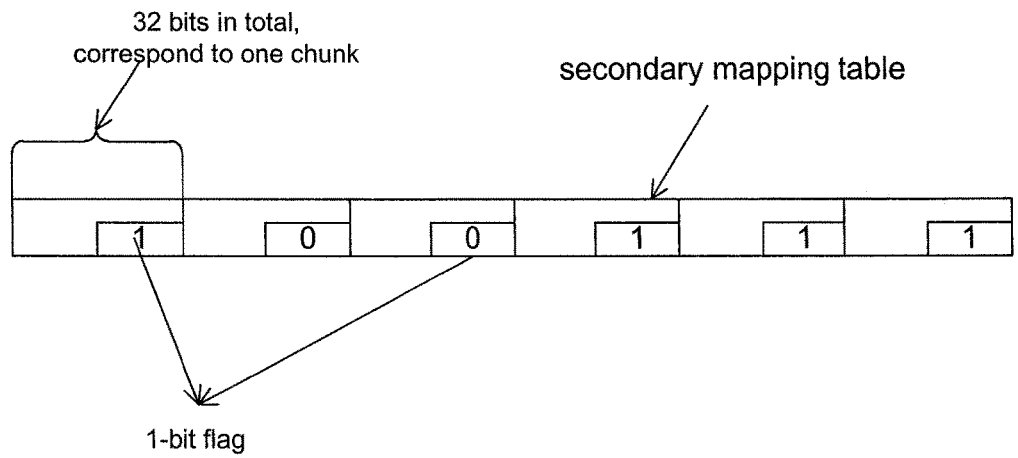
FIG. 5 is a view illustrating the location of a flag in the primary mapping table according to the embodiments of the invention.

In another embodiment of the invention, Q=1. Or said differently, the flag of the mapping element is one bit. In a particular implementation, if the flag is 1, it indicates that this chunk was accessed last time, and thus should be loaded preferentially this time; if the flag is 0, it indicates that this chunk was not accessed last time, and thus may not be loaded. Or, if the flag is 0, it indicates that this chunk was accessed last time, and thus should be loaded preferentially this time; if the flag is 1, it indicates that this chunk was not accessed last time, and thus may not be loaded. As shown in FIG. 5, if 32 bits are used in the primary mapping table to represent the secondary mapping table information of a chunk, 1 bit in the 32 bits is used to represent the flag which indicates loading the chunk or not at the next power-on. If a writing operation occurs at the chunk indexed by the secondary mapping table this time, the flag is set as 1, or otherwise as 0. The flag will be updated to the flash when the primary mapping table is updated. Therefore, at the next power-on, it can be determined loading the secondary mapping table or not according to the flag. A flag of 1 indicates loading while a flag of 0 indicates not loading. Loading, at each power-on, the secondary mapping table corresponding to the data accessed in the last usage will improve the hit ratio of the access and accelerate the hard disk response. It should be noted, though the flag is located at the last bit of the 32 bits as shown in FIG. 5, the flag may be located at any location of the 32 bits in a particular implementation.

Seventh Embodiment

Based on the previous embodiments, an embodiment of the invention provides a method for forming a mapping table which is applied to an electronic device. The functions carried out by this method for forming a mapping table can be implemented by a SSD controller in the electronic device invoking program codes. The program codes, of course, can be stored in a computer storing medium. That is, the electronic device includes at least a SSD controller and a storing medium.

Figure 6:
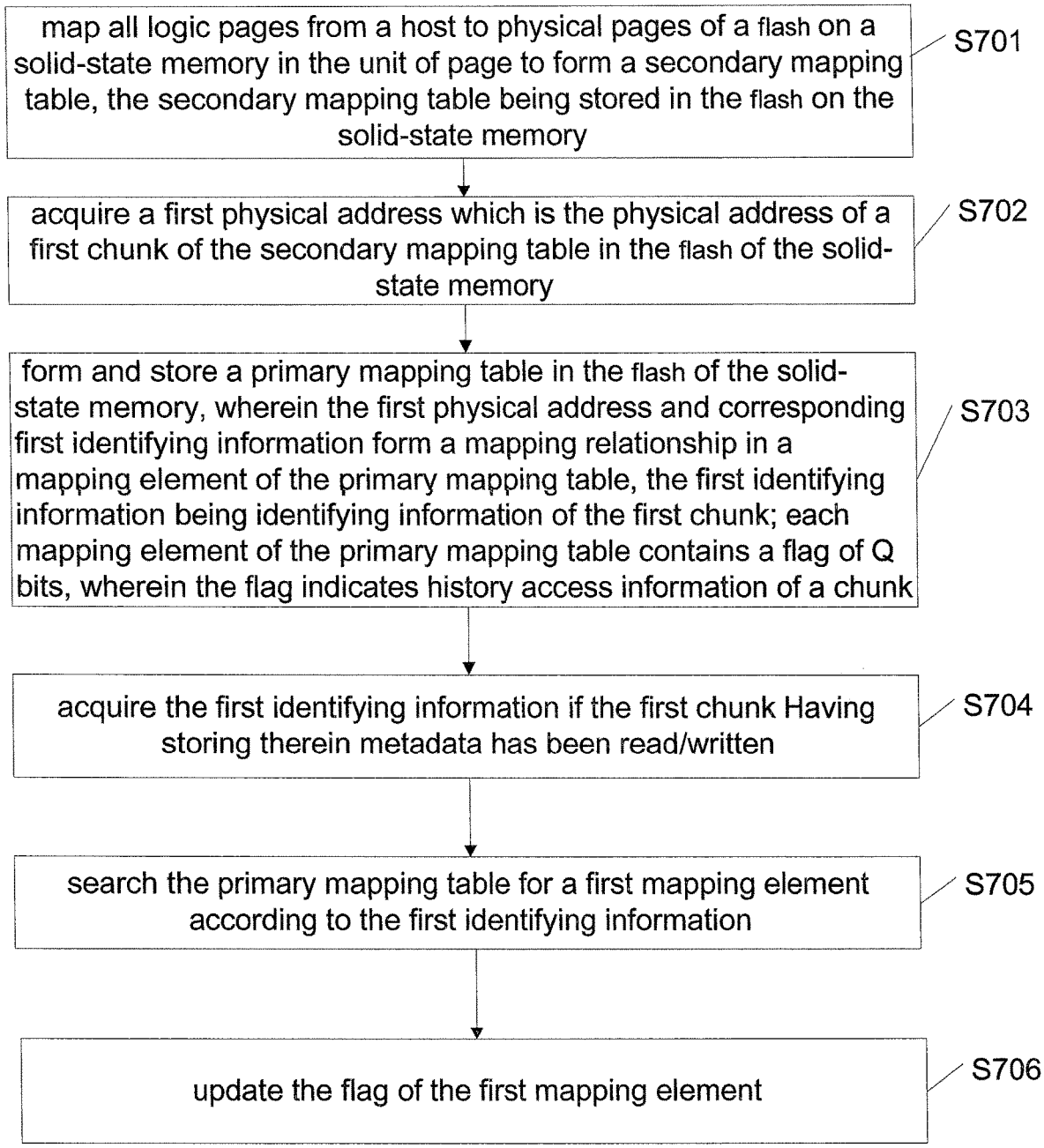
FIG. 6 is a view illustrating an implementation flow of a method for forming a mapping table according to the seventh embodiment of the invention.

FIG. 6 is a view illustrating an implementation flow of a method for forming a mapping table according to the first embodiment of the invention. As shown in FIG. 6, the method includes:

Step S701, mapping all logic pages from a host to physical pages of a flash on a solid-state memory in the unit of page to form a secondary mapping table, the secondary mapping table being stored in the flash on the solid-state memory;

The mapping table here includes a primary mapping table and a secondary mapping table. The host refers to an electronic device with respect to the solid-state memory.

Step S702, acquiring a first physical address which is the physical address of a first chunk of the secondary mapping table in the flash of the solid-state memory;

Here the secondary mapping table in step S701 needs to be divided in chunks, i.e. the secondary mapping table is divided in chunks to obtain a divided secondary mapping table. In a particular implementation, the chunk may be a physical page or a physical block, or less than a physical page as long as a physical address representative of the chunk can be found. The first chunk may be any chunk in the divided secondary mapping table. Or said differently, the first chunk may be any chunk when the mapping information in the secondary mapping table is stored in chunks.

Step S703, forming and storing a primary mapping table in the flash of the solid-state memory, wherein the first physical address and corresponding first identifying information form a mapping relationship in a mapping element of the primary mapping table, the first identifying information being identifying information of the first chunk; each mapping element of the primary mapping table contains a flag of Q bits, wherein the flag indicates history access information of a chunk Step S704, acquiring the first identifying information if the first chunk having stored therein metadata has been read/written;

The first identifying information here is identifying information of the first chunk;

Step S705, searching the primary mapping table for a first mapping element according to the first identifying information;

Step S706, updating the flag of the first mapping element.

Here, the flag of Q bits in the first mapping element is updated.

Steps 704-707 in the embodiment of the invention provide a method for updating the flag in the primary mapping table.

Eighth Embodiment

Based on the previous embodiments, an embodiment of the invention provides a method for loading a mapping table which is applied to an electronic device. The functions carried out by this method for loading a mapping table can be implemented by a SSD controller in the electronic device invoking program codes. The program codes, of course, can be stored in a computer storing medium. That is, the electronic device includes at least a SSD controller and a storing medium.

Figure 7:
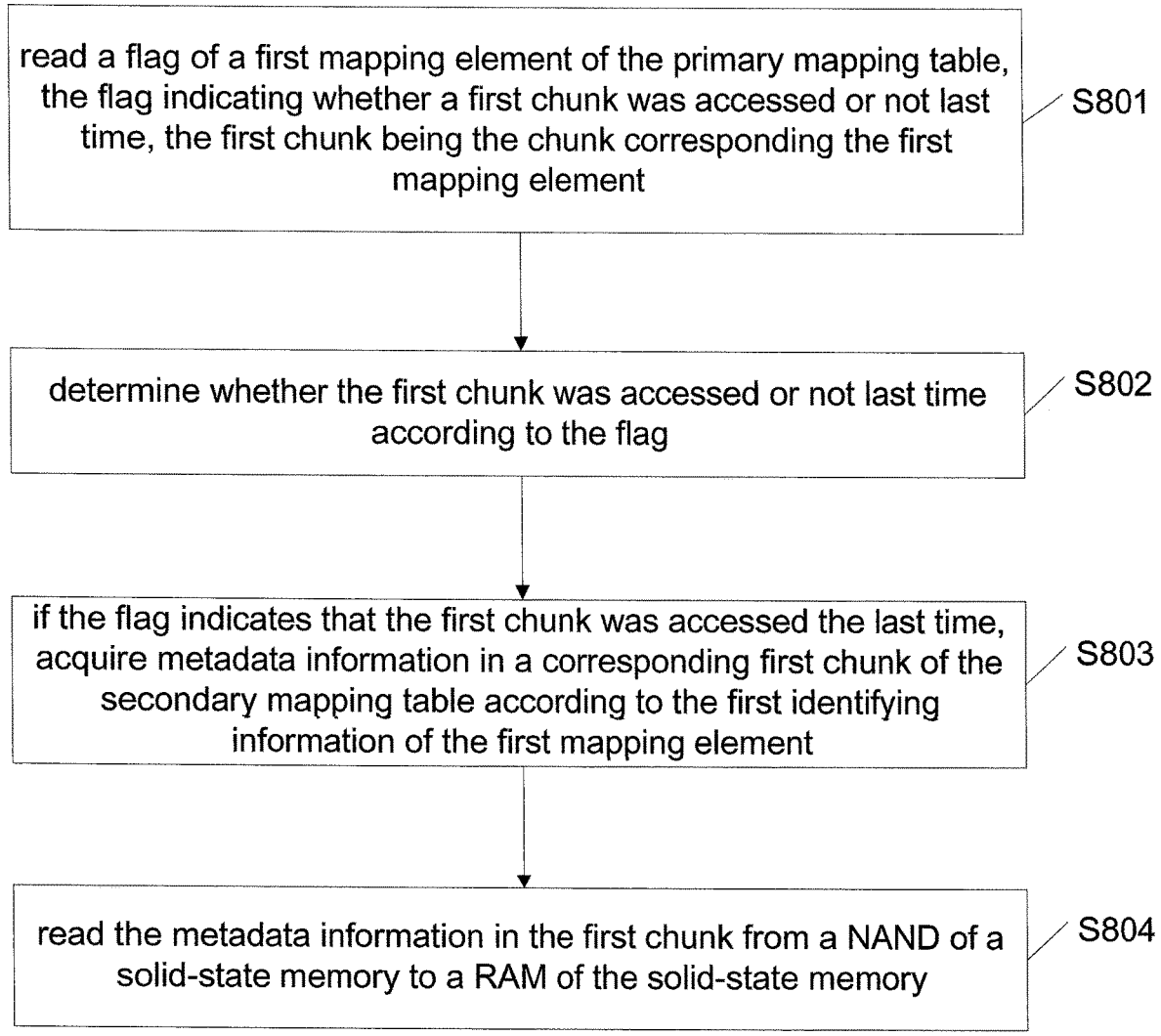
FIG. 7 is a view illustrating an implementation flow of a method for loading a mapping table according to the eighth embodiment of the invention.

FIG. 7 is a view illustrating an implementation flow of a method for loading a mapping table according to the eighth embodiment of the invention. As shown in FIG. 7, the method includes:

Step S801, reading a flag of a first mapping element of the primary mapping table, the flag indicating whether a first chunk was accessed or not last time, the first chunk being the chunk corresponding the first mapping element;

Step S802, determining whether the first chunk was accessed or not last time according to the flag;

Step S803, if the flag indicates that the first chunk was accessed last time, acquiring metadata information in a corresponding first chunk of the secondary mapping table according to the first identifying information of the first mapping element;

Step S804, reading the metadata information in the first chunk from a flash of a solid-state memory to a RAM of the solid-state memory;

In the embodiment of the invention, the method further includes:

reading the primary mapping table from the flash of the solid-state memory to the RAM of the solid-state memory after the power-on of the solid-state memory.

In the embodiment of the invention, the method further includes:

not reading the metadata information in the first chunk from the flash of the solid-state memory to the RAM of the solid-state memory if the flag indicates that the first chunk was not accessed last time.

It should be noted here that, in the first loading after the power-on, the chunks of the secondary mapping table may not be loaded. When it is required by the electronic device or required to be accessed the next time, the chunks of the secondary mapping table needs to be loaded from the flash of the solid-state memory.

Ninth Embodiment

Based on the previous embodiment, an embodiment of the invention provides an electronic device which includes a first forming unit, a first acquiring unit and a second forming unit. The first forming unit, the first acquiring unit and the second forming unit can be implemented by a SSD controller in the electronic device or a particular logic circuitry. In a particular implementation, a processor may be a Central Processing Unit (CPU), a microprocessor (MPU), a Digital Signal Processor (DSP), a Field Programmable Gate Array (FPGA), etc.

Figure 8:
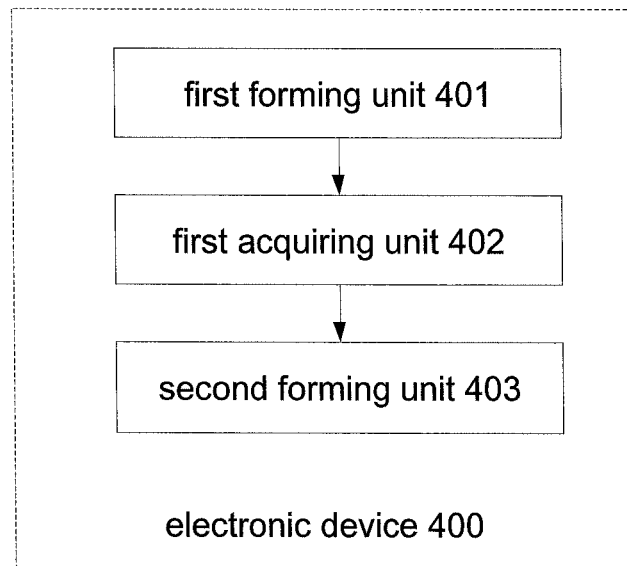
FIG. 8 is a view illustrating a structure of an electronic device according to the ninth embodiment of the invention.

FIG. 8 is a view illustrating a structure of an electronic device according to the ninth embodiment of the invention. As shown in FIG. 8, the electronic device 400 includes a first forming unit 401, a first acquiring unit 402 and a second forming unit 403, wherein:

the first forming unit 401 is configured to map all logic pages from a host to physical pages of a flash on a solid-state memory by using a page-level mapping method to form a secondary mapping table, the secondary mapping table being stored in the flash on the solid-state memory;

the first acquiring unit 402 is configured to acquire a first physical address which is the physical address of a first chunk of the secondary mapping table in the flash of the solid-state memory; and the second forming unit 403 is configured to form and store a primary mapping table in the flash of the solid-state memory, wherein the first physical address and corresponding first identifying information form a mapping relationship in a mapping element of the primary mapping table, the first identifying information being identifying information of the first chunk.

In the embodiment of the invention, mapping information of the first chunk of the secondary mapping table further includes first identifying information.

In the embodiment of the invention, the electronic device further includes a first memory unit and a second memory unit, wherein:

the first memory unit is configured to store the mapping information of the secondary mapping table in the flash in chunks; and the second memory unit is configured to store the first primary mapping table in the flash in its entirety.

In the embodiment of the invention, the electronic device further includes a first recording unit, a twelfth acquiring unit, a searching unit and a second recording unit, wherein:

the first recording unit is configured to recording the information about storing of the mapping information of the first chunk in the flash of the solid-state memory, such as the timestamp information and version tag information, etc;

the twelfth acquiring unit is configured to acquire the first identifying information of the first chunk from the secondary mapping table;

the searching unit is configured to search the primary mapping table for a first mapping element according to the first identifying information; and the second recording unit is configured to record the timestamp information and the version tag information in the first mapping element.

As can be seen from the above, each mapping element further includes information for recording that the mapping information in chunks in the secondary mapping table is stored in the flash of the solid-state memory, such as the timestamp information and version tag information, etc.

It should be noted that the above implementation of the electronic device is described similarly with respect to that of the method and has the same technical effect, and thus will not be described in detail. One with ordinary skills in the art can refer the method embodiment of the invention for the technical details that are not described in the electronic device embodiment of the invention, which will not be described for the purpose of briefness.

Tenth Embodiment

Based on the previous embodiment, an embodiment of the invention provides an electronic device which includes a second acquiring unit, a first determining unit, a first updating unit, a third acquiring unit and a second updating unit. These units can be implemented by a SSD controller in the electronic device or a particular logic circuitry. In a particular implementation, a processor may be a Central Processing Unit (CPU), a microprocessor (MPU), a Digital Signal Processor (DSP), a Field Programmable Gate Array (FPGA), etc.

Figure 9:
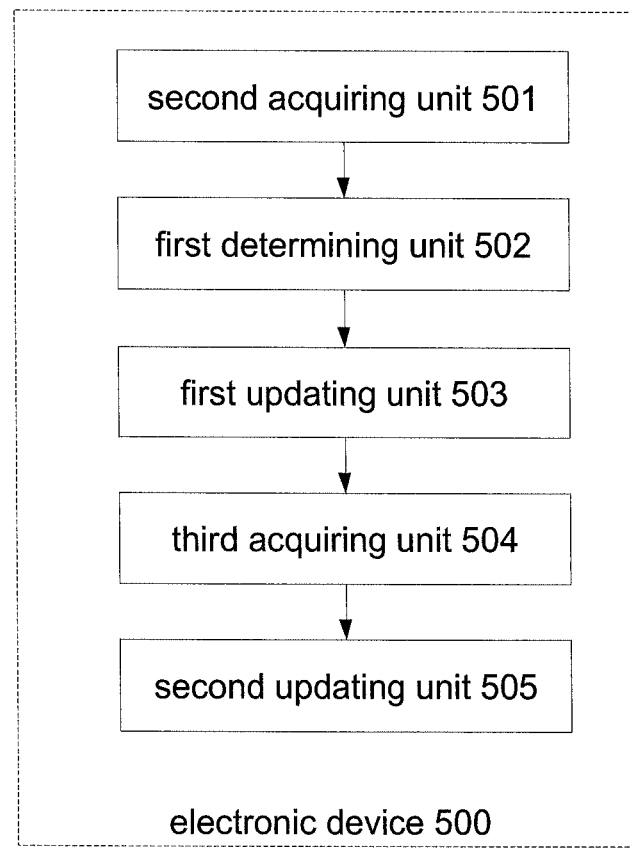
FIG. 9 is a view illustrating a structure of an electronic device according to the tenth embodiment of the invention.

FIG. 9 is a view illustrating a structure of an electronic device according to the tenth embodiment of the invention. As shown in FIG. 9, the electronic device 500 includes a second acquiring unit 501, a first determining unit 502, a first updating unit 503, a third acquiring unit 504 and a second updating unit 505, wherein:

the second acquiring unit 501 is configured to acquire a parameter for updating the primary mapping table and the secondary mapping table;

the first determining unit 502 is configured to determine whether the parameter satisfies a preset condition or not;

the first updating unit 503 is configured to update the mapping information in the secondary mapping table from a RAM of the solid-state memory to the flash if the preset condition is satisfied;

the third acquiring unit 504 is configured to acquire a second physical address and corresponding second identifying information, the second physical address being the physical address of the mapping information in chucks in the updated flash; and the second updating unit 505 is configured to update the primary mapping table according to the second identifying information and the second physical address.

In the embodiment of the invention, the electronic device further includes a second determining unit, a fourth acquiring unit and a third updating unit, wherein:

the second determining unit is configured to determine whether the secondary mapping table is completely updated from the RAM of the solid-state memory to the flash, if it is, the fourth acquiring unit is triggered, or otherwise the third updating unit is triggered;

the fourth acquiring unit is configured to acquire the second physical address and the second identifying information again; and the third updating unit is configured to continue to update the secondary mapping table from the RAM of the solid-state memory to the flash.

It should be noted that the above implementation of the electronic device is described similarly with respect to that of the method and has the same technical effect, and thus will not be described in detail. One with ordinary skills in the art can refer the method embodiment of the invention for the technical details that are not described in the electronic device embodiment of the invention, which will not be described for the purpose of briefness.

Eleventh Embodiment

Based on the previous embodiment, an embodiment of the invention provides an electronic device which includes a fifth acquiring unit, a sixth acquiring unit, a first reading unit, a seventh acquiring unit, an eighth acquiring unit, a third determining unit and a second reading unit. These units can be implemented by a SSD controller in the electronic device or a particular logic circuitry. In a particular implementation, a processor may be a Central Processing Unit (CPU), a microprocessor (MPU), a Digital Signal Processor (DSP), a Field Programmable Gate Array (FPGA), etc.

The electronic device includes a fifth acquiring unit, a sixth acquiring unit, a first reading unit, a seventh acquiring unit, an eighth acquiring unit, a third determining unit and a second reading unit, wherein:

the fifth acquiring unit is configured to acquire a third physical address from the primary mapping table, the third physical address being the physical address stored in a mapping element of the primary mapping table;

the sixth acquiring unit is configured to acquire secondary mapping table information of a corresponding third chunk according to the third physical address;

the first reading unit is configured to read the secondary mapping table information of the third chunk from the flash of the solid-state memory to the RAM of the solid-state memory;

the seventh acquiring unit is configured to acquire third identifying information from the primary mapping table, the third identifying information being the identifying information of the third chunk corresponding to the third physical address;

the eighth acquiring unit is configured to acquire fourth identifying information from the secondary mapping table information of the third chunk according to the third physical address;

the third determining unit is configured to determine whether the third identifying information and the fourth identifying information are the same, and if they are the same, the second reading unit is triggered; and the second reading unit is configured to read the secondary mapping table information of the third chunk from the flash of the solid-state memory to the RAM of the solid-state memory.

In the embodiment of the invention, the electronic device further includes a ninth acquiring unit, a first writing unit, a tenth acquiring unit and a second writing unit, wherein:

the ninth acquiring unit is configured to acquire the physical address of the chunk corresponding to the third identifying information;

the first writing unit is configured to update the physical address stored in the mapping element corresponding to the third identifying information in the primary mapping table as the physical address of the corresponding chunk, if the number of the physical addresses of the corresponding chunks is 1;

the tenth acquiring unit is configured to acquire timestamp information corresponding to the physical address of each of the corresponding chunks if the number of the physical addresses of the corresponding chunks is greater than 1; and the second writing unit is configured to update the physical address stored in the mapping element corresponding to the third identifying information in the primary mapping table as the physical address of the chunk with the latest timestamp.

It should be noted that the above implementation of the electronic device is described similarly with respect to that of the method and has the same technical effect, and thus will not be described in detail. One with ordinary skills in the art can refer the method embodiment of the invention for the technical details that are not described in the electronic device embodiment of the invention, which will not be described for the purpose of briefness.

Twelfth Embodiment

Based on the previous embodiment, an embodiment of the invention provides an electronic device which includes a ninth acquiring unit, a first writing unit, a tenth acquiring unit and a second writing unit. These units can be implemented by a SSD controller in the electronic device or a particular logic circuitry. In a particular implementation, a processor may be a Central Processing Unit (CPU), a microprocessor (MPU), a Digital Signal Processor (DSP), a Field Programmable Gate Array (FPGA), etc.

The electronic device includes a ninth acquiring unit, a first writing unit, a tenth acquiring unit and a second writing unit, wherein:

the ninth acquiring unit is configured to, according to fifth identifying information stored in a mapping element of the primary mapping table, acquire the physical address of the chunk corresponding to the fifth identifying information;

the first writing unit is configured to update the physical address stored in the mapping element corresponding to the fifth identifying information in the primary mapping table as the physical address of the corresponding chunk if the number of the physical addresses of the corresponding chunks is 1;

the tenth acquiring unit is configured to acquire timestamp information corresponding to the physical address of each of the corresponding chunks, if the number of the physical addresses of the corresponding chunks is greater than 1; and the second writing unit is configured to update the physical address stored in the mapping element corresponding to the fifth identifying information in the primary mapping table as the physical address of the chunk with the latest timestamp.

Thirteenth Embodiment

Based on the previous embodiment, an embodiment of the invention provides an electronic device which includes a first forming unit, a first acquiring unit and a second forming unit. The first forming unit, the first acquiring unit and the second forming unit can be implemented by a SSD controller in the electronic device or a particular logic circuitry. In a particular implementation, a processor may be a Central Processing Unit (CPU), a microprocessor (MPU), a Digital Signal Processor (DSP), a Field Programmable Gate Array (FPGA), etc.

The electronic device 400 includes a first forming unit 401, a first acquiring unit 402 and a second forming unit 403, wherein:

the first forming unit 401 is configured to map all logic pages from a host to physical pages of a flash on a solid-state memory by using a page-level mapping method to form a secondary mapping table, the secondary mapping table being stored in the flash on the solid-state memory;

the first acquiring unit 402 is configured to acquire a first physical address which is the physical address of a first chunk of the secondary mapping table in the flash of the solid-state memory; and the second forming unit 403 is configured to form and store a primary mapping table in the flash of the solid-state memory, wherein the first physical address and corresponding first identifying information form a mapping relationship in a mapping element of the primary mapping table, the first identifying information being identifying information of the first chunk.

In the embodiment of the invention, mapping information of the first chunk of the secondary mapping table further includes the first identifying information.

Each mapping element of the primary mapping table contains a flag of Q bits, wherein the flag indicates history access information of a chunk.

In the embodiment of the invention, Q=1.

In the embodiment of the invention, the electronic device further includes an eleventh acquiring unit, a searching unit and a fourth updating unit, wherein:

the eleventh acquiring unit is configured to acquire the first identifying information if the first chunk having stored therein metadata has been read/written, the first identifying information being identifying information of the first chunk;

the searching unit is configured to search the primary mapping table for a first mapping element according to the first identifying information; and the fourth updating unit is configured to update the flag of the first mapping element.

It should be noted that the above implementation of the electronic device is described similarly with respect to that of the method and has the same technical effect, and thus will not be described in detail. One with ordinary skills in the art can refer the method embodiment of the invention for the technical details that are not described in the electronic device embodiment of the invention, which will not be described for the purpose of briefness.

Fourteenth Embodiment

Based on the previous embodiment, an embodiment of the invention provides an electronic device which includes a third reading unit, a fourth determining unit, a twelfth acquiring unit and a fourth reading unit. The third reading unit, the fourth determining unit, the twelfth acquiring unit and the fourth reading unit can be implemented by a SSD controller in the electronic device or a particular logic circuitry. In a particular implementation, a processor may be a Central Processing Unit (CPU), a microprocessor (MPU), a Digital Signal Processor (DSP), a Field Programmable Gate Array (FPGA), etc.

Figure 10:
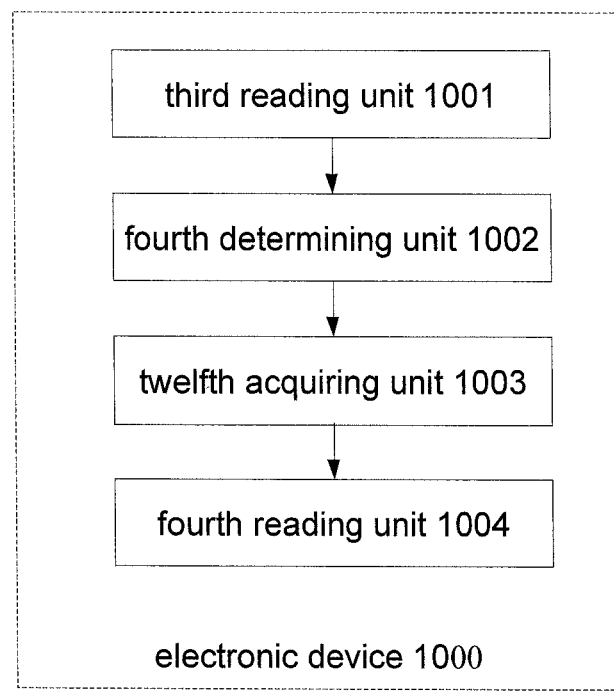
FIG. 10 is a view illustrating a structure of an electronic device according to the fourteenth embodiment of the invention.

FIG. 10 is a view illustrating a structure of an electronic device according to the fourteenth embodiment of the invention. As shown in FIG. 10, the electronic device 1000 includes a third reading unit 1001, a fourth determining unit 1002, a twelfth acquiring unit 1003 and a fourth reading unit 1004, wherein:

the third reading unit 1001 is configured to read a flag of a first mapping element of the primary mapping table, the flag indicating whether a first chunk was accessed or not last time, the first chunk being the chunk corresponding the first mapping element;

the fourth determining unit 1002 is configured to determine whether the first chunk was accessed or not last time according to the flag;

the twelfth acquiring unit 1003 is configured to acquire metadata information of a corresponding first chunk of the secondary mapping table according to the first identifying information of the first mapping element if the flag indicates that the first chunk was accessed last time; and the fourth reading unit 1004 is configured to read the metadata information in the first chunk from a flash of a solid-state memory to a RAM of the solid-state memory.

In the embodiment of the invention, the electronic device further includes a fifth reading unit configured to read the primary mapping table from the flash of the solid-state memory to a RAM of the solid-state memory after the power-on of the solid-state memory.

In the embodiment of the invention, the electronic device further includes a processing unit configured not to read the metadata information in the first chunk from a flash of a solid-state memory to a RAM of the solid-state memory if the flag indicates that the first chunk was not accessed last time.

It should be noted that the above implementation of the electronic device is described similarly with respect to that of the method and has the same technical effect, and thus will not be described in detail. One with ordinary skills in the art can refer the method embodiment of the invention for the technical details tthat are not described in the electronic device embodiment of the invention, which will not be described for the purpose of briefness.

Fifteenth Embodiment

Figure 11:
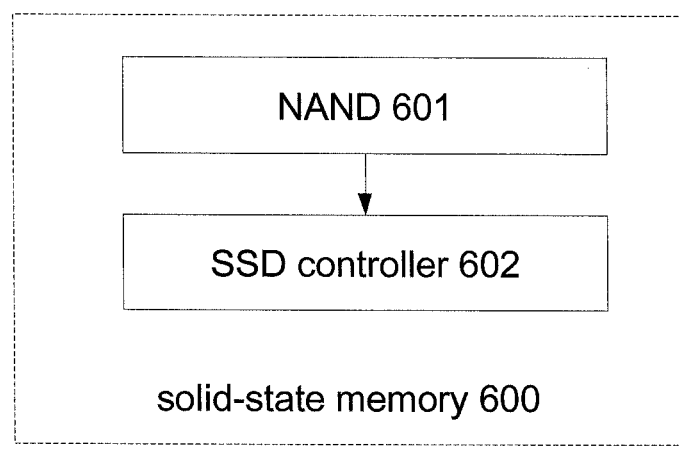
FIG. 11 is a view illustrating a structure of a solid-state memory according to the embodiments of the invention.

Based on the previous embodiment, an embodiment of the invention provides an electronic device which includes a solid-state memory (SSD). FIG. 11 is a view illustrating a structure of a solid-state memory according to the embodiments of the invention. As shown in FIG. 11, the solid-state memory 600 includes a flash 601 and a SSD controller 602, wherein:

the SSD controller 602 is configured to map all logic pages from a host to physical pages of a flash on a solid-state memory by using a page-level mapping method to form a secondary mapping table, the secondary mapping table being stored in the flash on the solid-state memory; acquire a first physical address which is the physical address of a first chunk of the secondary mapping table in the flash of the solid-state memory; and form and store a primary mapping table in the flash of the solid-state memory, wherein the first physical address and corresponding first identifying information form a mapping relationship in a mapping element of the primary mapping table, the first identifying information being identifying information of the first chunk.

Based on the previous embodiment, an embodiment of the invention further provides an electronic device which includes a solid-state memory (SSD). The solid-state memory includes a flash and a SSD controller, wherein:

the SSD controller is configured to acquire a parameter for updating the primary mapping table and the secondary mapping table; determine whether the parameter satisfies a preset condition or not; update the mapping information in the secondary mapping table from a RAM of the solid-state memory to the flash if the preset condition is satisfied; acquire a second physical address and corresponding second identifying information, the second physical address being the physical address of the mapping information in chucks in the updated flash; and update the primary mapping table according to the second identifying information and the second physical address.

Based on the previous embodiment, an embodiment of the invention further provides an electronic device which includes a solid-state memory (SSD). The solid-state memory includes a flash and a SSD controller, wherein:

the SSD controller is configured to acquire a third physical address from the primary mapping table, the third physical address being the physical address stored in a mapping element of the primary mapping table; acquire secondary mapping table information of a corresponding third chunk according to the third physical address; acquire third identifying information from the primary mapping table, the third identifying information being the identifying information of the third chunk corresponding to the third physical address; acquire fourth identifying information from the secondary mapping table information of the third chunk according to the third physical address; determine whether the third identifying information and the fourth identifying information are the same, and if they are the same, read the secondary mapping table information of the third chunk from the flash of the solid-state memory to the RAM of the solid-state memory.

Based on the previous embodiment, an embodiment of the invention further provides an electronic device which includes a solid-state memory (SSD). The solid-state memory includes a flash and a SSD controller, wherein:

the SSD controller is configured to, according to fifth identifying information stored in a mapping element of the primary mapping table, acquire the physical address of the chunk corresponding to the fifth identifying information; update the physical address stored in the mapping element corresponding to the fifth identifying information in the primary mapping table as the physical address of the corresponding chunk if the number of the physical addresses of the corresponding chunks is 1; and acquire timestamp information corresponding to the physical address of each of the corresponding chunks, and update the physical address stored in the mapping element corresponding to the fifth identifying information in the primary mapping table as the physical address of the chunk with the latest timestamp if the number of the physical addresses of the corresponding chunks is greater than 1.

Based on the previous embodiment, an embodiment of the invention further provides an electronic device which includes a solid-state memory (SSD). The solid-state memory includes a flash and a SSD controller, wherein:

the SSD controller is configured to map all logic pages from a host to physical pages of a flash on a solid-state memory by using a page-level mapping method to form a secondary mapping table, the secondary mapping table being stored in the flash on the solid-state memory; acquire a first physical address which is the physical address of a first chunk of the secondary mapping table in the flash of the solid-state memory; and form and store a primary mapping table in the flash of the solid-state memory, wherein the first physical address and corresponding first identifying information form a mapping relationship in a mapping element of the primary mapping table, the first identifying information being identifying information of the first chunk. Each mapping element of the primary mapping table contains a flag of Q bits, wherein the flag indicates history access information of the corresponding chunk.

Based on the previous embodiment, an embodiment of the invention further provides an electronic device which includes a solid-state memory (SSD). The solid-state memory includes a flash and a SSD controller, wherein:

the SSD controller is configured to read a flag of a first mapping element of the primary mapping table, the flag indicating whether a first chunk was accessed or not last time, the first chunk being the chunk corresponding the first mapping element; determine whether the first chunk was accessed or not last time according to the flag; acquire metadata information in a corresponding first chunk of the secondary mapping table according to the first identifying information of the first mapping element if the flag indicates that the first chunk was accessed last time; and read the metadata information in the first chunk from a flash of a solid-state memory to a RAM of the solid-state memory.

It should be noted that the above implementation of the electronic device is described similarly with respect to that of the method and has the same technical effect, and thus will not be described in detail. One with ordinary skills in the art can refer the method embodiment of the invention for the technical details that are not described in the electronic device embodiment of the invention, which will not be described for the purpose of briefness.

It should be appreciated that the phrase "an embodiment" or "one embodiment" as used throughout the description means that specific features, structures or characteristics related to the embodiments are included in at least one embodiment of the invention. Therefore, the phrases "an embodiment" or "one embodiment" used in different location of the description do not necessarily refer to the same embodiment. Furthermore, these specific features, structures or characteristics can be combined into one or more embodiments arbitrarily. It should be appreciated that, in various embodiments of the invention, the numbers of the processes do not indicate the order to perform these processes. The order to perform these processes should be determined by their functions and internal logics, and thus does not limit the implementation of the embodiments of the invention. The numbers of the embodiments of the invention are used for the purpose of description only. They do not represent the preference of these embodiments.

It should be noted here that the terms "comprising", "including" or any other variation thereof, are intended to cover a non-exclusive inclusion, such that a process, method, article or device comprising a series of elements includes not only those elements, but also other elements not expressly listed, or further includes inherent elements in such process, method, article or device. In the absence of more restrictive, the element defined by the statement "comprising/including a . . . " does not exclude the existence of additional identical elements in the process, method, article or device comprising said element.

It should be appreciated from the embodiments of the present application that the disclosed device and method can be implemented in alternative ways. The device embodiments as described above are illustrative only. For example, while the units have been divided in accordance with their logical functions, other divisions are possible in practice. For example, more than one unit or element can be combined or can be integrated into another system, or some features can be ignored or omitted. In addition, the coupling, direct coupling or communicative connection between various components as shown or discussed can be an indirect coupling or communicative connection via some interface, device or unit and can be electrical, mechanical or in another form.

The units described above as separated may or may not be physically separated. The components shown as units may or may not be physical units. They can be co-located or can be distributed over a number of network elements. Depending on actual requirements, some or all of the units can be selected to achieve the object of the present disclosure.

Further, all the functional units in various embodiments of the present disclosure can be integrated within one processing unit, or each of these units can be a separate unit, or two or more units can be integrated into one unit. Such integrated unit can be implemented in hardware, possibly in combination with software functional units.

It may be understood by the skilled in the art that all or parts of steps for implementing the above method embodiments may be implemented by hardware associated with program instructions. The above program may be stored in a computer readable storage medium, which when executed, may perform steps of the above method embodiments. The above storage medium may comprise various media which may store program codes, such as a movable storage device, a read-only memory, a random access memory, a magnetic disc or an optical disc.

Or, if the units of the present disclosure integrated as described above are implemented in a form of software functional modules and are sold or used as a separate product, they may also be stored in a computer readable storage medium. Based on such understanding, the technical solution of the embodiment in the present disclosure may substantially, or the part of the technical solution contributing to the prior art may be embodied in a form of a software product. The computer software product is stored in a storage medium including several instructions which may be used for causing one computer device (which may be a personal computer, a server, or a network device etc.) to perform all or parts of the methods of various embodiments in the present disclosure. The storage medium as described above may comprise various media which may store program codes, such as a movable storage device, a read-only memory, a random access memory, a magnetic disc or an optical disc. In this way, the embodiments of the disclosure are not limited by a specific combination of hardware and software.

As illustrated above, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for a mapping table in a solid-state memory, comprising:
   mapping a plurality of logic pages from a host to physical pages of a flash on the solid-state memory by using a page-level mapping to form a secondary mapping table, wherein the secondary mapping table is stored in the flash on the solid-state memory;
   acquiring a first physical address, wherein the secondary mapping table comprises a plurality of chunks, and each chunk of the plurality of chunks has a physical address; the first physical address is the physical address of a first chunk of the plurality of chunks; and
   forming a primary mapping table and storing the primary mapping table in the flash, wherein the first physical address and first identifying information form a mapping relationship in a mapping element of the primary mapping table, the first identifying information being identifying information of the first chunk; and
   the method further comprising recovering the secondary mapping table according to the primary mapping table if the secondary mapping table is damaged while the primary mapping table is complete, which comprises:
   acquiring a third physical address from the primary mapping table, wherein the third physical address is the physical address stored in the mapping element;
   acquiring secondary mapping table information of a third chunk of the plurality of chunks according to the third physical address;
   acquiring third identifying information from the primary mapping table, the third identifying information being the identifying information has the mapping relationship with the third physical address;
   acquiring fourth identifying information from the secondary mapping table information of the third chunk according to the third physical address;
   determining whether the third identifying information and the fourth identifying information are the same; and
   if they are the same, reading the secondary mapping table information of the third chunk from the flash to the RAM,
   wherein each chunk of the plurality of chunks comprises one or more address translation entries in the secondary mapping table.

2. The method of claim 1, wherein the primary mapping table includes a plurality of mapping elements, each mapping element stores a mapping relationship; each mapping element further comprises timestamp information and a version tag for recording that the mapping information in chunks is stored in the flash.

3. The method of claim 1, wherein:
   the mapping information of the secondary mapping table is stored in the flash in chunks; and
   mapping information of the primary mapping table is stored in the flash in its entirety.

4. The method of claim 2, further comprising recovering the primary mapping table according to the secondary mapping table if the secondary mapping table has been updated while the primary mapping table was not updated, which comprises:
   according to fifth identifying information stored in the mapping element, acquiring the physical address of fifth chunk of the plurality of chunks from the secondary mapping table;
   updating the physical address stored in fifth mapping element which stores the mapping relationship formed by the fifth identifying information if the number of the physical address of the fifth chunk is 1; and
   acquiring timestamp information of the fifth mapping element, and updating the physical address stored in the fifth mapping element as the physical address of the fifth chunk with the latest timestamp if the number of the physical addresses of the fifth chunk is greater than 1.

5. The method of claim 1, further comprising:
   reading the primary mapping table from the flash to the RAM after the power-on of the solid-state memory.

6. The method of claim 1, wherein mapping information of the first chunk of the secondary mapping table comprises the first identifying information.

7. The method of claim 1, wherein each mapping element of the primary mapping table contains a flag indicating history access information of each chunk of the plurality of chunks, respectively.

8. The method of claim 7, further comprising:
   acquiring the first identifying information if the first chunk having stored therein metadata has been read/written;
   searching the primary mapping table for a first mapping element according to the first identifying information; and
   updating the flag stored in the first mapping element.

9. The method of claim 7, further comprising:
   reading the flag of a first mapping element of the primary mapping table, wherein the flag indicating whether the first chunk was accessed or not last time;
   determining whether the first chunk was accessed or not last time according to the flag;

acquiring metadata information in the first chunk according to the first identifying information if the flag indicating that the first chunk was accessed last time; and writing the metadata information to the RAM, wherein the last time is the most recent access time while the flash is operational and is being read and/or written to.

10. The method of claim 9, further comprising:
not writing the metadata information to the RAM if the flag indicating that the first chunk was not accessed last time.

11. The method of claim 1, further comprising:
acquiring a parameter for updating the primary mapping table and the secondary mapping table when mapping information in the secondary mapping table is updated in a RAM on the solid-state memory, wherein the parameter is a rewriting ratio indicative of a ratio between a size of rewritten portion of a mapping table and a size of the mapping table, the mapping table comprising the primary mapping table and the secondary mapping table;

a first determining step determines whether the rewriting ratio is higher than a preset ratio or not;

updating the flash by writing updated mapping information in the secondary mapping table from the RAM to the flash if the rewriting ratio is higher than the preset ratio;

acquiring a second physical address and second identifying information, the second physical address is the physical address of the mapping information in any of the plurality of chunks in the flash updated; and updating the primary mapping table according to the second identifying information and the second physical address.

12. The method of claim 11, further comprising:
a second determining step determines the updated mapping information in the secondary mapping table is completely updated from the RAM to the flash; and acquiring the second physical address and the second identifying information again based on the second determining result.

13. An electronic device comprising:
a processor comprising hardware, and
a memory having stored thereon computer programs, wherein the computer programs, when executed by the processor, cause the processor to:
map a plurality of logic pages from a host to physical pages of a flash on a solid-state memory by using a page-level mapping method to form a secondary mapping table, wherein the secondary mapping table is stored in the flash on the solid-state memory;
acquire a first physical address, wherein the secondary mapping table comprises a plurality of chunks, and each chunk of the plurality of chunks has a physical address; the first physical address is the physical address of a first chunk of the plurality of chunks; and
form a primary mapping table and store the primary mapping table in the flash, wherein the first physical address and first identifying information form a mapping relationship in a mapping element of the primary mapping table, the first identifying information being identifying information of the first chunk, and
the processor is further caused to recover the secondary mapping table according to the primary mapping table if the secondary mapping table is damaged while the primary mapping table is complete, which comprises:

acquire a third physical address from the primary mapping table, wherein the third physical address is the physical address stored in the mapping element;
acquire secondary mapping table information of a third chunk of the plurality of chunks according to the third physical address;
acquire third identifying information from the primary mapping table, the third identifying information being the identifying information has the mapping relationship with the third physical address;
acquire fourth identifying information from the secondary mapping table information of the third chunk according to the third physical address;
determine whether the third identifying information and the fourth identifying information are the same; and
if they are the same, read the secondary mapping table information of the third chunk from the flash to the RAM,
wherein each chunk of the plurality of chunks comprises one or more address translation entries in the secondary mapping table.

14. An electronic device comprising a solid-state memory (SSD), the solid-state memory comprising a flash and a SSD controller, wherein:
the SSD controller is configured to map a plurality of logic pages from a host to physical pages of a flash on the solid-state memory by using a page-level mapping method to form a secondary mapping table, wherein the secondary mapping table is stored in the flash; acquire a first physical address, wherein the secondary mapping table comprises a plurality of chunks, and each chunk of the plurality of chunks has a physical address; the first physical address is the physical address of a first chunk of the plurality of chunks; and form a primary mapping table and store the primary mapping table in the flash, wherein the first physical address and first identifying information form a mapping relationship in a mapping element of the primary mapping table, the first identifying information being identifying information of the first chunk, and
the SSD controller is further configured to:
acquire a third physical address from the primary mapping table, wherein the third physical address is the physical address stored in the mapping element;
acquire secondary mapping table information of a third chunk of the plurality of chunks according to the third physical address;
acquire third identifying information from the primary mapping table, the third identifying information being the identifying information has the mapping relationship with the third physical address;
acquire fourth identifying information from the secondary mapping table information of the third chunk according to the third physical address;
determine whether the third identifying information and the fourth identifying information are the same; and
if they are the same, read the secondary mapping table information of the third chunk from the flash to the RAM,
wherein each chunk of the plurality of chunks comprises one or more address translation entries in the secondary mapping table.

15. The electronic device of claim 14, wherein:
the primary mapping table includes a plurality of mapping elements, each mapping element stores a mapping relationship; each mapping element further comprises timestamp information and a version tag for recording that the mapping information in chunks is stored in the flash;

the SSD controller is further configured to, according to fifth identifying information stored in the mapping element, acquire the physical address of fifth chunk of the plurality of chunks from the secondary mapping table; update the physical address stored in fifth mapping element which stores the mapping relationship formed by the fifth identifying information if the number of the physical address of the fifth chunk is 1; and acquire timestamp information of the fifth mapping element, and update the physical address stored in the fifth mapping element as the physical address of the fifth chunk with the latest timestamp if the number of the physical addresses of the fifth chunk is greater than 1.

16. The electronic device of claim 14, wherein:

each mapping element of the primary mapping table contains a flag indicating history access information of each chunk of the plurality of chunks, respectively.

17. The electronic device of claim 16, wherein:

the SSD controller is further configured to read a flag of a first mapping element of the primary mapping table, wherein the flag indicating whether the first chunk was accessed or not last time; determine whether the first chunk was accessed or not last time according to the flag; acquire metadata information in the first chunk according to the first identifying information if the flag indicating that the first chunk was accessed last time; and write the metadata information to the RAM, wherein the last time is the most recent access time while the flash device is operational and is being read and/or written to.

18. The electronic device of claim 14, wherein the SSD controller is further configured to:

acquire a parameter for updating the primary mapping table and the secondary mapping table when mapping information in the secondary mapping table is updated in a RAM on the solid-state memory, wherein the parameter is a rewriting ratio indicative of a ratio between a size of rewritten portion of a mapping table and a size of the mapping table, the mapping table comprising the primary mapping table and the secondary mapping table;

perform a first determining step to determine whether the rewriting ratio is higher than a preset ratio or not;

update the flash by writing updated mapping information in the secondary mapping table from the RAM to the flash if the rewriting ratio is higher than the preset ratio;

acquire a second physical address and second identifying information, the second physical address is the physical address of the mapping information in any of the plurality of chunks in the flash updated; and update the primary mapping table according to the second identifying information and the second physical address.

* * * * *